INVENTOR.
RICHARD L. SNYDER,
BY Walter J. Adam
ATTORNEY

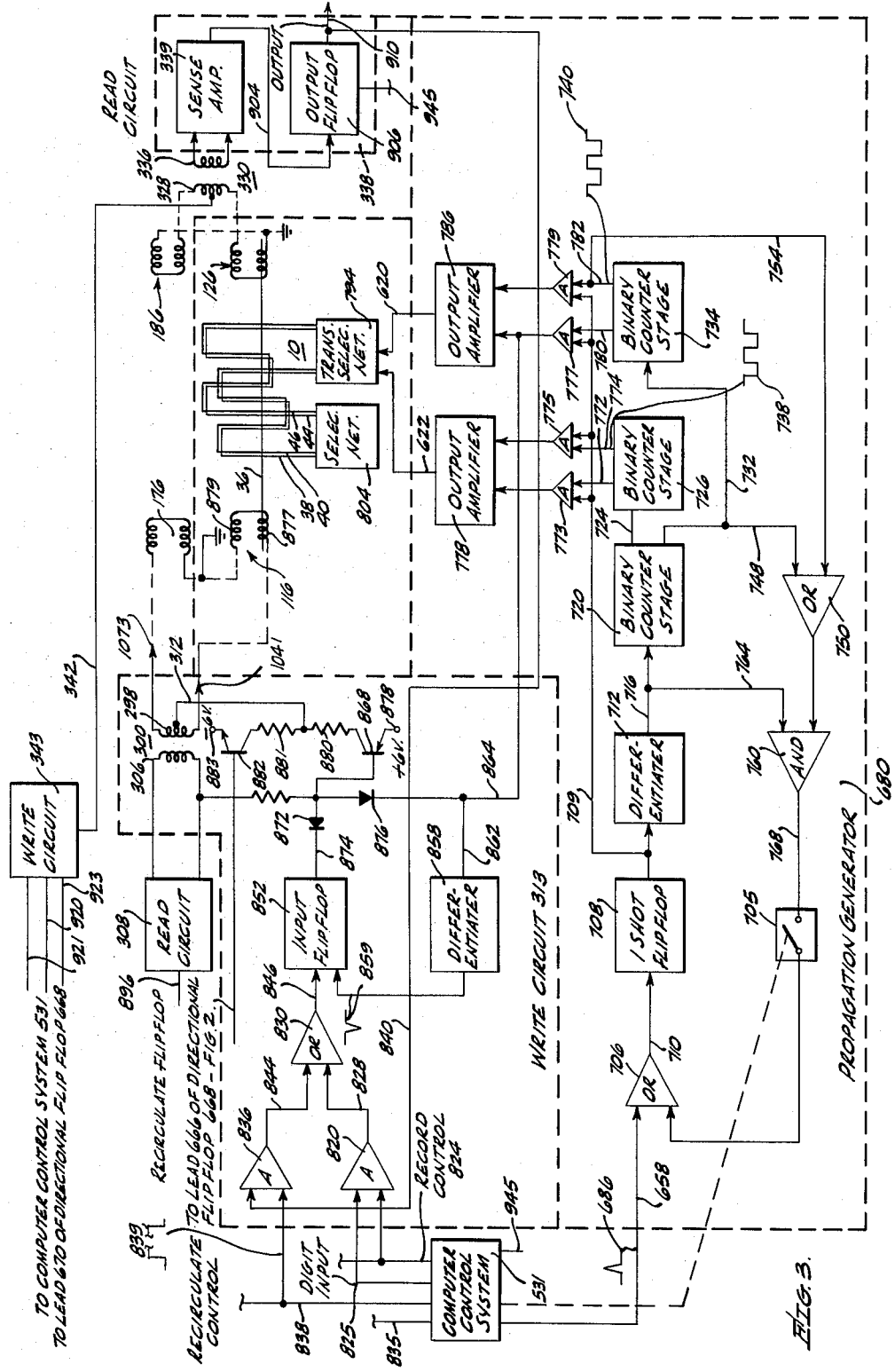

April 26, 1966 R. L. SNYDER 3,248,716
MULTICHANNEL SHIFT REGISTER SYSTEM
Filed June 28, 1962 10 Sheets-Sheet 4

April 26, 1966  R. L. SNYDER  3,248,716
MULTICHANNEL SHIFT REGISTER SYSTEM
Filed June 28, 1962  10 Sheets-Sheet 5

United States Patent Office 3,248,716
Patented Apr. 26, 1966

3,248,716
MULTICHANNEL SHIFT REGISTER SYSTEM
Richard L. Snyder, Malibu, Calif., assignor to Hughes Aircraft Company, Culver City, Calif., a corporation of Delaware
Filed June 28, 1962, Ser. No. 205,894
12 Claims. (Cl. 340—174)

This invention relates to magnetic memory systems and particularly to a system for selectively storing and reading information in a plurality of channels by shifting of magnetic domains through magnetic mediums.

Conventional magnetic drum systems provide for selection of information stored on any one of a plurality of channels by energizing desired read heads. The drum rotating in a single direction allows information to be stored and read therefrom in a fixed sequence, thus requiring reading all of the stored bits on a channel from a starting point in order to obtain the last bits of stored information. Magnetic drums require a separate sense and recording amplifier for each channel or track resulting in relatively complex circuit arrangements. Also, magnetic drums have the disadvantage that within practical dimensions, a relatively small amount of information can be stored. Further, magnetic drums are subject to vibration problems which may cause erroneous recording and reading of binary information. A system that utilizes a principle of storing information in a plurality of magnetic wires by properly arranging magnetic domains which are shifted through the wire sequentially has the advantages of large storage capacity, relatively small dimensions and rapid accessibility to specific stored information.

It is therefore an object of this invention to provide an improved memory system that stores and reads binary information by shifting magnetic domains of selected polarities through a plurality of magnetic mediums.

It is a further object of this invention to provide a mechanically static memory system providing access to stored channels of information by selecting magnetic wires for shifting magnetic domains therethrough.

It is another object of this invention to provide a magnetic shift register system in which selected binary information is propagated in and out of a plurality of magnetic wires by selectively applying propagating fields to the magnetic wires.

It is still another object of this invention to provide a shift register type storage system utilizing magnetic wires from which stored binary information may be serially shifted in a selected direction to provide rapid access to specific groups of information.

It is another object of this invention to provide a memory system in which information is recorded and read from channels in different banks of channels through common read amplifier circuits and common write amplifier circuits.

Briefly, in accordance with this invention, a memory system is provided with a plurality of banks of shift register elements each having wire channels through which magnetic domains are selectively propagated by a polyphase driving arrangement. Each shift register wire channel includes a read-write coil at both ends with corresponding read-write coils of corresponding shift register wire channels of each bank coupled in series. The signals from the polyphase driving arrangement are applied through bank selection means to propagate magnetic domains through the wires in only the selected bank. The magnetic domains may be propagated in either direction by a directional control arrangement that reverses the phase relations of the driving signals. The read-write coils are coupled to balanced amplifier arrangements so that binary information may be read or recorded at each coil. The information read from the plurality of shift register wires in a selected bank is selectively utilized or recirculated. A four cycle timing control arrangement is provided so that a proper sequence of magnetic polarities is written into selected shift registers.

The novel features of this invention, as well as the invention itself, both as to its organization and method of operation, will best be understood from the accompanying description taken in connection with the accompanying drawings, in which like characters refer to like parts, and in which:

FIG. 3 is a schematic circuit and block diagram of the control system in accordance with this invention for the shift register system of FIGS. 1 and 2;

Figure 1:
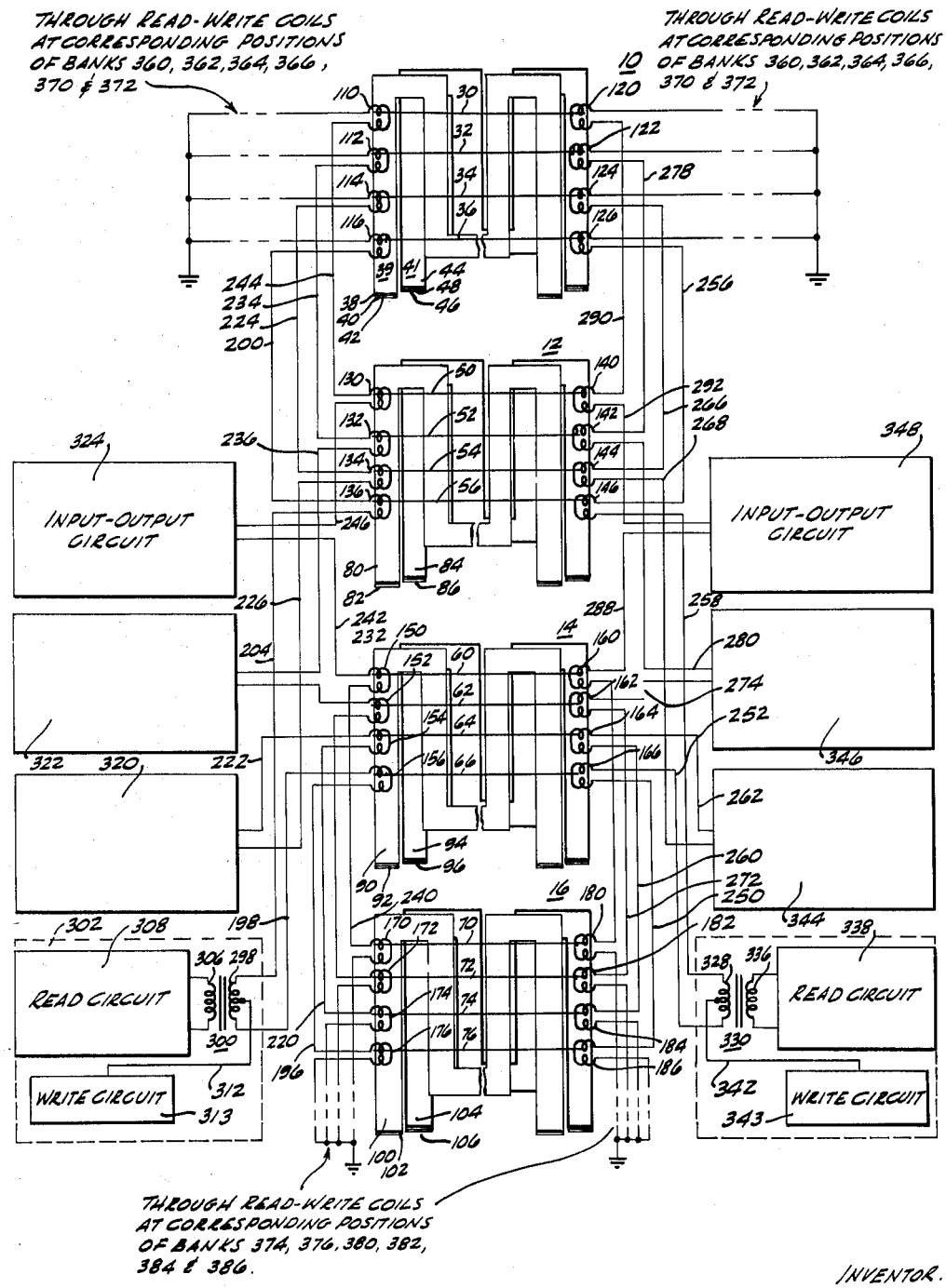
FIG. 1 is a schematic circuit diagram of a portion of a shift register memory system in accordance with this invention showing the magnetic wires, the polyphase driver conductors and the read-write connections.
Figure 2:
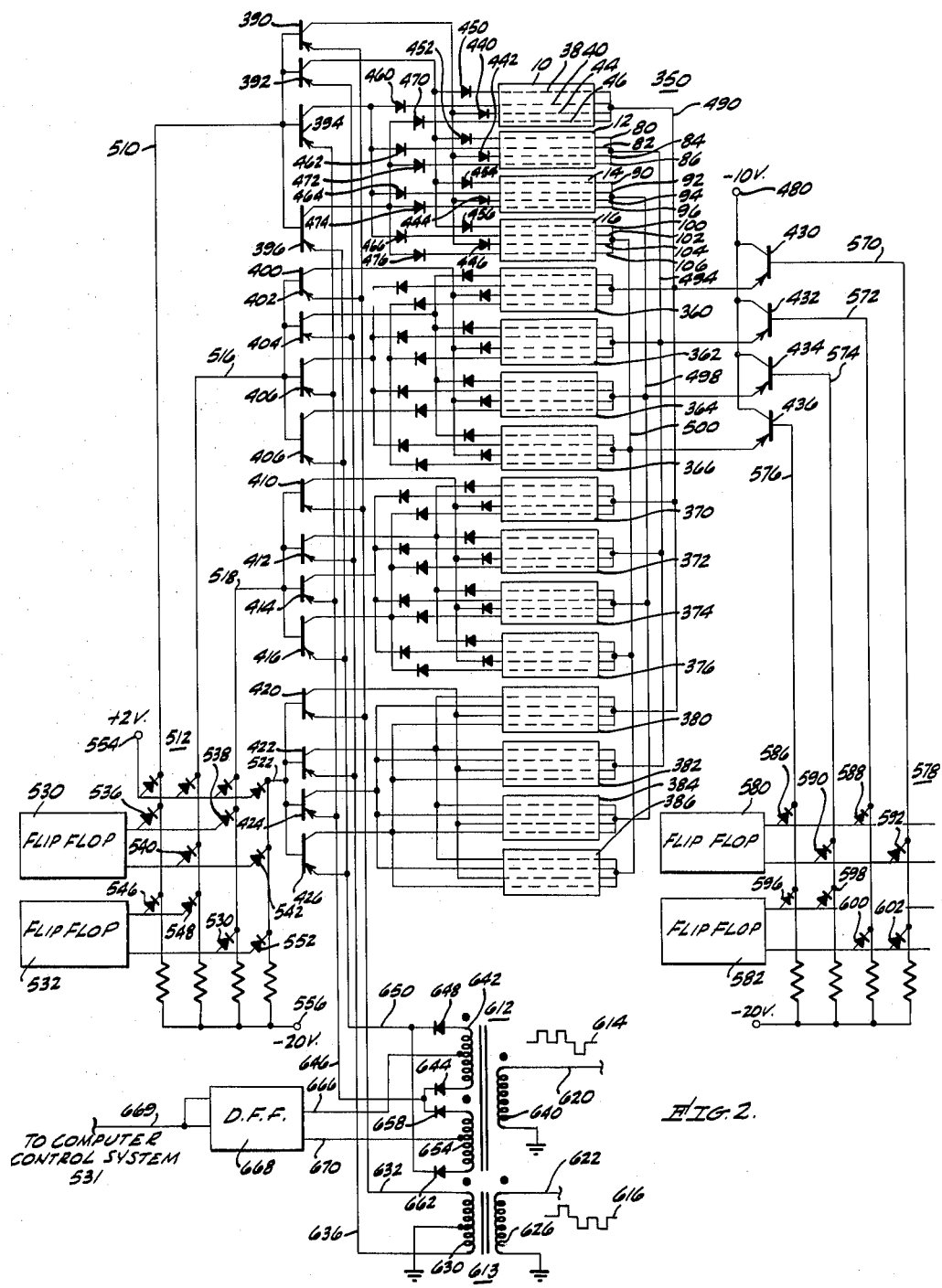
FIG. 2 is a schematic circuit diagram of the polyphase driver and selection arrangement in accordance with this invention to be utilized in conjunction with the shift register system of FIG. 1.

Referring first to FIG. 1, four banks 10, 12, 14 and 16 of polyphase driver conductors and shift register wires are shown which may represent a portion of a 16 bank system of which the driving arrangement is shown in FIG. 2. The banks 10, 12, 14 and 16 may represent one group of four banks. Each bank such as 10 includes magnetic wires 30, 32, 34 and 36. Also, each bank such as 10 includes first polyphase conductors 38 and 40 which may be maintained together and adjacent to each other with an insulating strip 42 therebetween and second polyphase conductors 44 and 46 with an insulating strip 48 therebetween. The conductors 38 and 40 form a combined conductor 39 and the conductors 44 and 46 form a combined conductor 41. In one arrangement in accordance with this invention, current driving pulses are passed in a selected bank such as 10 in opposite directions through the conductors 38 and 40 and in opposite directions through the conductors 44 and 46. Thus, an alternating current is effectively passed through each of the two sets of conductors, and magnetic propagating fields in phase quadrature are applied to the magnetic wires 30, 32, 34 and 36.

The bank 12 includes magnetic wires 50, 52, 54, and 56; the bank 14 includes magnetic wires 60, 62, 64 and 66; and the bank 16 includes magnetic wires 70, 72, 74 and 76. Also, the bank 12 includes first polyphase conductors 80 and 82 and second polyphase conductors 84 and 86; the bank 14 includes first polyphase conductors 90 and 92 and second polyphase conductors 94 and 96; and the bank 16 includes first polyphase conductors 100 and 102 and second polyphase conductors 104 and 106. It is to be noted at this time that the magnetic wires such as 30 may be maintained under constant tension. It has been found that by stretching magnetic wires to within 80 perecnt of the elastic limit thereof so that the magnetic domains are oriented parallel to the longitudinal axis of the wire and maintaining the wires under that tension, reliable propagation and domain formation is provided. The magnetic wires have been found to provide reliable operation when the tension is 80 to 90 percent of the elastic limit. However, it is to be understood that tension ranges of the magnetic wires or magnetic wires having the desired propagation characteristics without tension may be utilized. The magnetic wires may be maintained under tension by any suitable arrangement such as that shown in FIG. 12. Also, the invention is not limited to magnetic wires but includes any suitable magnetic medium.

Read-write coils are located near both ends of each of the magnetic wires for either responding to a propagated magnetic domain passing thereby or for establishing magnetic domains during writing or recording. Read-write coils 110, 112, 114 and 116 are positioned adjacent to the first ends of the respective magnetic wires 30, 32, 34, and 36, and read-write coils 120, 122, 124 and 126 are positioned at opposite ends of the respective magnetic wires. In bank 12, read-write coils 130, 132, 134 and 136 and read-write coils 140, 142, 144 and 146 are respectively positioned adjacent to opposite ends of the magnetic wires 50, 52, 54 and 56. In the bank 14, the magnetic wires 60, 62, 64 and 66 have respective read-write coils 150, 152, 154, and 156 positioned adjacent to one end thereof and read-write coils 160, 162, 164 and 166 positioned adjacent to the other end thereof. Also, in the bank 16, read-write coils 170, 172, 174 and 176 are positioned adjacent to one end of respective magnetic wires 70, 72, 74 and 76, and read-write coils 180, 182, 184 and 186 are positioned at opposite ends of the respective magnetic wires. It is to be noted that each read-write coil such as 110 includes two coils oppositely wound so as to cancel fields induced therein by the propagating fields.

Each of the read-write coils in corresponding positions in each bank at the same ends thereof are coupled in series because reading and writing is performed at one time in only one selected bank. The read-write coils of the other 12 banks of FIG. 2 are also coupled in series with the read-write coils of FIG. 1 in a similar manner. The coil 176 has one end coupled to ground and the other end coupled through a lead 196 to a first end of the read-write coil 156, the other end thereof being coupled to a lead 198. The read-write coil 116 has one end coupled to ground and the other end coupled to a lead 200 which in turn is coupled through the read-write coil 136 to a lead 204. In a similar manner, the coils 174 and 154 are coupled in series through a lead 220 to a lead 222 and the coils 134 and 114 are coupled in series through a lead 224 to a lead 226, the coils 172 and 152 are coupled in series through a lead 230 to a lead 232, and the coils 112 and 132 are coupled in series through a lead 234 to a lead 236. Also, the coils 170 and 150 are coupled in series through a lead 240 to a lead 242 and the coils 110 and 130 are coupled through a lead 244 to a lead 246. One end of the coils 110, 112, 114 and 116 are coupled to ground through a dotted section which indicates that read-write coils at corresponding positions of banks 360, 362, 364, 366, 370 and 372 of FIG. 2 are coupled in series therein, for example. Also, one end of the coils 170, 172, 174 and 176 are coupled to ground through a dotted section which indicates that read-write coils at corresponding positions of banks 374, 376, 380, 382, 384 and 386, for example, are coupled in series therein.

At the other ends of the magnetic wires such as 76, the read-write coil 186 is coupled between ground and a lead 250 which in turn is coupled through the coil 166 to a lead 252. The coil 126 has one end coupled to ground and the other end coupled through a lead 256 to one end of the coil 146 with the other end coupled to a lead 258. In a similar manner, the coils 184 and 164 are coupled in series through a lead 260 to a lead 262, the coils 124 and 144 are coupled through a lead 266 to a lead 268, the coils 182 and 162 are coupled through a lead 272 to a lead 274, and the coils 122 and 142 are coupled through a lead 278 to a lead 280. Also, the coils 180 and 160 are coupled through a lead 286 to a lead 288, and the coils 120 and 140 are coupled through a lead 290 to a lead 292. One end of the read-write coils 120, 122, 124 and 126 is coupled to ground serially through read-write coils at corresponding positions of banks 360, 362, 364, 366, 370 and 372 (FIG. 2), for example, as indicated by the dotted portions of the leads coupled to the coils of the bank 10. Also, one end of the read-write coils 180, 182, 184 and 186 is coupled to ground through read-write coils at corresponding positions of banks 374, 376, 380, 382, 384 and 386 of FIG. 2, for example.

The leads 198 and 204 are coupled to opposite ends of a winding 298 of a balanced transformer 300 of an input-output circuit 302. The transformer 300 includes a winding 306 coupled to a read amplifier circuit 308. For writing into the connected read-write coils, the winding 298 has a center tap coupled to a lead 312 which in turn is coupled to a write circuit 313. The leads 222 and 226, the leads 232 and 236, and the leads 242 and 246 are respectively coupled to similar input-output circuits 320, 322 and 324.

At the other ends of the magnetic wires, the leads 252 and 258 are coupled to opposite ends of a winding 328 of a balanced transformer 330 included in an input-output circuit 332. The transformer 330 includes a winding 336 coupled to a read amplifier circuit 338. For writing through the connected coils, the winding 328 has a center tap coupled to a lead 342, which in turn is coupled to a write circuit 343. The leads 262 and 268, the leads 274 and 280, and the leads 288 and 292 are respectively coupled to similar input-output circuits 344, 346 and 348.

Referring now to FIG. 2, the arrangement of the polyphase driving circuits for propagating magnetic domains along the selected magnetic wires such as 30, 32, 34 and 36 will be explained. The banks 10, 12, 14 and 16 of FIG. 1 are shown in the upper portion of FIG. 2 as a first group 350. In order to illustrate the selection system in accordance with this invention, groups 352, 354 and 356 each including four banks of polyphase driving conductors are shown.

The group 352 includes the banks 360, 362, 364 and 366, the group 354 includes the banks 370, 372, 374 and 376, and the group 356 includes the banks 380, 382, 384 and 386. In each of the banks such as bank 10, the polyphase conductors 38, 40, 44 and 46 are shown as dotted straight leads for convenience of illustration. However, it is to be understood that the polyphase conductors are arranged as shown in FIG. 1, with each two conductors positioned together to provide first and second phase driving arrangements which are offset so that one alternately leads and lags the other. For selection of polyphase conductors in the group 350, pnp type transistors 390, 392, 394 and 396 are provided. Selection at the same end of the polyphase conductors is similarly provided in group 352 by pnp type transistors 400, 402, 404 and 406, in group 354 by pnp type transistors 410, 412, 414, and 416, and in group 356 by pnp type transistors 420, 422, 424 and 426. Selection at the other end of the polyphase conductors is provided by pnp type transistors 430, 432, 434 and 436.

Considering first the group 350, the transistors 390 and 392 provide selection of current to pass alternately in first and second directions through the conductors 40 and 38 and the transistors 394 and 396 provides selection of current to pass alternately in first and second directions through the conductors 44 and 46, each pair effectively providing an alternating current. The transistors 390 and 392 provide a current signal of a first effective driving phase and the transistors 394 and 396 provide a current signal of a second effective driving phase. The collector of the transistor 390 is coupled through the anode to cathode path of a diode 440 to the conductor 40, through the anode to cathode path of a diode 442 to the conductor 84, through the anode to cathode path of a diode 444 to the conductor 94, and through the anode to cathode path of a diode 446 to the conductor 104. The collector of the transistor 392 is coupled through the anode to cathode path of a diode 450 to the conductor 38, through the anode to cathode path of a diode 452 to the conductor 80, through the anode to cathode path of a diode 454 to the conductor 90, and through the anode to cathode path of a diode 456 to the conductor 100. The collector of the transistor 394 is coupled through the anode to cathode path of a diode 460 to the conductor 44, through the anode to cathode path of a diode 462 to the conductor 82, through the anode to cathode path of a diode 464 to the conductor 92, and through the anode to cathode path of a diode 466 to the conductor 102. Also, the collector of the transistor 396 is coupled through the anode to cathode path of a diode 470 to the conductor 46, through the anode to cathode path of a diode 472 to the conductor 86, through the anode to cathode path of a diode 474 to the conductor 96, and through the anode to cathode path of a diode 476 to the conductor 106. The collectors of each of the transistors of the groups 352, 354 and 356, such as the transistors 400, 402, 404 and 406 of the group 352 are coupled in a similar manner through diodes to the polyphase conductors in the corresponding banks.

At the other end of the polyphase selection array, the collectors of the transistors 430, 432, 434 and 436 are coupled to a suitable negative source of potential such as a −10 volt terminal 480 to which the polyphase driving current may flow through a selected one of the transistors. The emitter of the transistor 430 is coupled to a lead 490 which in turn is coupled in common to an end of the four conductors of each of the banks 10, 360, 370 and 380, such as to the conductors 38, 40, 44, and 46 of the bank 10. The emitter of the transistor 432 is coupled to a lead 494 which in turn is coupled to an end of the four conductors in the banks 12, 362, 372 and 382, such as the conductors 80, 82, 84 and 86 in the bank 12. The emitter of the transistor 434 is coupled to a lead 498 and in turn to an end of the conductors in the banks 14, 364, 374 and 384 such as the conductors 90, 92, 94 and 96 of the bank 14. In a similar manner, the emitter of the transistor 436 is coupled to a lead 500 which in turn is coupled to one end of the conductors in the banks 16, 366, 376 and 386, such as the conductors 100, 102 and 104 and 106 of the bank 16.

Considering now the selection operation at the left side of the array, the bases of the transistors 390, 392, 394 and 396 are coupled through a lead 510 to a diode selection matrix 512. Similarly, the bases of the transistors 400, 402, 404 and 406 are coupled through a lead 516 to the selection matrix 512, the bases of the transistors 410, 412, 414 and 416 are coupled through a lead 518 to the selection matrix 512, and the bases of the transistors 420, 422, 424 and 426 are coupled through a lead 522 to the selection matrix 512. Selection of one of these common base leads is provided by the binary state of selection flip flops 530 and 532 which respond to input signals applied thereto from a computer control system 531 (FIG. 3) through appropriate leads (not shown). The first output lead of the flip flop 530 is coupled through the anode to cathode path of diodes 536 and 538 to respective base leads 510 and 518, and the second output lead of the flip flop 530 is coupled through the anode to cathode path of diodes 540 and 542 to respective base leads 516 and 522. The first output lead of the flip flop 532 is coupled through diodes 546 and 548 to respective base leads 510 and 516, and the second output lead of the flip flop 532 is coupled through diodes 550 and 552 to the respective base leads 518 and 552. A suitable source of potential such as a +2 volt terminal 554 is coupled through suitable diodes to the base leads 510, 516, 518 and 522, which leads are in turn coupled through resistors to a −20 volt terminal 556. Thus, as is well known in the art, binary combinations stored in the flip flops 530 and 532 provide a negative potential on a selected one of the base leads 510, 516, 518 or 522.

To further explain the selection of a common bank of conductors for applying propagating signals thereto, the bases of the transistors 430, 432, 434 and 436 are respectively coupled through leads 570, 572, 574 and 576 to a selection matrix 578. Selection flip flops 580 and 582 are provided to control the matrix 578 in response to being triggered to select states from the computer control system 531 (FIG. 3) through appropriate leads (not shown). The first output lead of the flip flop 580 is coupled through the anode to cathode paths of diodes 586 and 588 to respective base leads 576 and 572 and the other output lead of the flip flop 580 is coupled through diodes 590 and 592 to respective base leads 574 and 570. Also, the first output lead of the flip flop 582 is coupled through diodes 596 and 598 to respective base leads 576 and 574 and the second output lead of the flip flop 582 is coupled through diodes 600 and 602 to respective base leads 572 and 570. The base leads 570, 572, 574 and 576 are coupled through resistors to a suitable source of potential such as a −20 volt terminal 608 so that depending on the binary states of the flip flops 580 and 582, a negative potential is applied to a selected one of the base leads 570, 572, 574 or 576.

Before further explaining the operation of selecting conductors for applying two signals in phase quadrature therethrough, the arrangement for reversing the direction of one of the polyphase signals will be first explained. It is to be noted at this time that in the polyphase driving arrangement in accordance with this invention, inversion of one of the driving signals or a 180 degree phase shift thereof reverses the direction of propagation of magnetic domains in the adjacent magnetic wires. Transformers 612 and 613 respond to polyphase signals of respective waveforms 614 and 616 applied to respective leads 620 and 622 from a propagation generator in accordance with this invention (FIG. 3).

The transformer 613 includes a primary winding 626 having one end coupled to the lead 622 and the other end coupled to ground. A secondary winding 630 of the transformer 613 has a center tap coupled to ground and a first end coupled through a lead 632 to the emitter of the transistors 390, 400, 410 and 420. The second end of the winding 630 is coupled through a lead 636 to the emitters of the transistors 392, 402, 412 and 422. The transformer 613 thus applies signals of a fixed phase relation to the transistors such as 390 and 392 in response to the signal of the waveform 616.

The transformer 612 has a primary winding 640 with one end coupled to the lead 620 and the other end coupled to ground. A secondary winding 642 of the transformer 612 has a first end coupled through the anode to cathode path of a diode 644 to a lead 646 which in turn is coupled to the emitters of transistors 394, 404, 414 and 424, and has a second end coupled through the cathode to anode path of a diode 68 to a lead 650, which in turn is coupled to the emitters of the transistors 396, 406, 416 and 426. A secondary winding 654 of the transformer 612 has a first end coupled through the cathode to anode path of a diode 658 to the lead 646, and a second end coupled through the cathode to anode path of a diode 662 to the lead 650.

For providing the change of phase of the signals applied to the leads 646 and 650 so as to reverse the direction of propagation of magnetic domains through the magnetic wires, the winding 642 has a center tap coupled through a lead 666 to a first output terminal of a directional flip flop 668, and the winding 654 has a center tap coupled through a lead 670 to the second output terminal of the directional flip flop 668. Thus, by applying a negative potential to one and a positive potential to the other of the leads 666 and 670, the winding to which a positive potential is applied is effectively energized to respond to the signal of the waveform 614. Because of the connections of the leads 650 and 646 relative to the polarity relations of the windings 642 and 654, the signals applied thereto are effectively reversed by selecting or energizing either the winding 642 or the winding 654. The directional flip flop 668 may be set by a common lead 669 coupled to the computer control system 531 (FIG. 3).

Therefore, as determined by the selected states of the flip flops 530 and 532, and the flip flops 580 and 582, one of the leads 510, 516, 518 or 522 has a negative potential applied thereto and one of the leads 570, 572, 574 or 576 has a negative potential applied thereto. Thus, for example, the transistors 390, 392, 394 and 396 may be biased close to conduction when a negative signal is applied to the lead 510 to respond to the signals applied to the emitters thereof as determined by the transformers 612 and 613. Also, one of the transistors such as 430 may be forward biased to effectively apply the −10 volt potential of the terminal 480 to the lead 490. Thus, it can be seen that depending on the polarity relation of the signals applied to the emitters of the selected four transistors 390, 392, 394 and 396, current will flow in selected directions and at selected times through the polyphase conductors of the selected bank 10. It is to be noted that the selection of the polyphase conductors of the bank 10 propagates information in the four magnetic shift register wires 30, 32, 34 and 36 of FIG. 1, but further gating, as will be explained subsequently, may provide recirculation of the information in three of the magnetic wires and utilization of information in only a selected wire. Also, the information may be utilized from all four selected wires. The setting of the directional flip flop 668 provides rapid access to coded information serially stored in the selected shift register wire such as 30 by shifting information in a desired direction. It should also be noted that information can be withdrawn from any recirculating register wire channel.

Referring now to FIG. 3, the propagation generator and typical read circuits and write circuits to be utilized in the systems of FIGS. 1 and 2 will be explained. A propagation generator 680 may respond to initiate pulses of a waveform 686 applied from the computer control system 531 to a lead 688. The initiate pulse of the waveform 686 initiates four cycles of driving pulses for propagating recorded information along a selected magnetic shift register wire when a switch 705 is closed. Also, the logical of the computer control system 531 may provide continuous initiate pulses of the waveform 686, that is four pulses for each four cycle period. An "or" gate 705 has one input terminal coupled to the lead 688 and an output coupled to a one-short flip flop or multivibrator circuit 708 through a lead 710. The trailing edge of the signal developed by the multivibrator 708 is differentiated in a differentiator 712 and applied through a lead 716 as a waveform 1061 (FIG. 8) to trigger a first binary counter 720. The signals developed by the counter 720 as shown by a waveform 737 (FIG. 8) are applied through a lead 724 to a second binary counter 726 and though a lead 732 to a third binary counter 734, which counters develop square wave pulses in a phase quadrature with each other as shown by waveforms 738 and 740 on respective leads 774 and 782. A feedback path is provided from the first counter 720 through a lead 748 to an "or" gate 750 and from the third counter 734 through a lead 754 to the "or" gate 750. An "and" gate 760 responds to the output of the "or" gate 750 and to the output signal of the differentiator 712 through a lead 764 to apply an initiate signal through a lead 768 and the switch 705 to the "or" gate 706. When the switch 705 is closed as determined by the computer control system 531, the signal applied from the differentiator 712 in coincidence with a negative signal applied from either the counter 720 or 734 retriggers the one shot flip flop 708 so that four pulses are formed from one initiate pulse of the waveform 686. The square driving signals of the waveforms 738 and 740 in phase quadrature with each other are respectively applied from the counter 726 through the lead 774 to a first phase amplifier 778 and from the binray counter 734 through lead 782 to a second phase amplifier 786. Also, inverted signals of the waveforms 738 and 740 are applied to respective leads 772 and 780 to the respective amplifiers 778 and 786. Included in the leads 772, 774, 780 and 782 are respective "and" gates 773, 775, 777 and 779. The signal having a first phase relation of the waveform 616 of FIG. 2 is applied from the amplifier 778 through the lead 622 directly to a direction selection transformer and selection network 794 which may include the transformers 612 and 613, as well as the selection network on the left side of the banks of FIG. 2. The second amplifier 786 applies a signal having a second phase relation of the waveform 614 of FIG. 2 through the lead 620 to the transformer and selection network 794. The one shot flip flop circuit 708 is coupled through a lead 709 to "and" gates 773, 775, 777 and 779 which are in turn coupled in series with the respective leads 772, 774, 780 and 782 to provide gating of the driving pulses. By gating the driving pulses, saturation problems from D.C. current flowing through the amplifiers 778, 786, 612 and 613 are substantially eliminated.

A shift register shown as a portion of the bank 10 includes only the magnetic wire 36 for purposes of illustration. Also, the shift register circuit of the bank 10 includes the polyphase conductors 38, 40, 44 and 46 coupled at one end to the transformer and selection network 794 and coupled at the other end to a selection network 804 which may include the diode selection matrix 578, the transistors 430, 432, 434 and 436, as well as the connecting leads as shown in FIG. 2.

The wire circuit 313 is shown coupled to the winding 298 of the transformer 300 as explained relative to FIG. 1. Also, the read circuit 338 is shown coupled to the winding 336 of the balanced transformer 330. The write circuit 313 and the read circuit 338 are examples of the eight write circuits and eight read circuits that are provided as shown in FIG. 1 by the input-output circuits 302, 320, 322, 324, 332, 344, 346 and 348. The read circuit 308 functions with the write circuit 343 and the write circuit 313 functions with the read circuit 338.

The record or write circuit 313 is arranged to accept a new digit input signal or to recirculate existing information in the shift register wire 36. An "and" gate 820 has a record control lead 824 and a digit input lead 825 coupled to the computer control system 531 and an output lead 828 coupled to an "or" gate 830. Also, an "and"

gate 836 has a recirculate control lead 838 coupled to the computer control system 531 and a recirculate lead 840 coupled from the read circuit 338. Other leads such as 835 connect the computer control system 531 to the digit input of other write circuits not shown in FIG. 3. Also, the leads 824 and 838 control the other write circuits not shown in FIG. 3. The signal developed by the "and" gate 836 is applied through a lead 844 to the "or" gate 830 which in turn is coupled through a lead 846 to an input flip flop 852. The input flip flop 852 is periodically reset by a differentiated signal of a waveform 859 applied thereto from a differentiator circuit 858 which in turn responds through leads 862 and 864 to the driving signal at the "and" gate 777. A pnp type transistor 868 is provided with a base coupled through the anode to cathode path of a diode 872 to a lead 874 which in turn is coupled to an output terminal of the input flip flop 852. The base of the transistor 868 is also coupled through the anode to cathode path of a diode 876 to the lead 864 for responding to an inverted form of the signal of the waveform 614 and a selected state of the flip flop 852 to bias the transistor 868 into conduction for writing a binary "one." The emitter of the transistor 868 is coupled to a suitable source of potential such as a +6 volt terminal 878 and the collector is coupled through a resistor 880 to the lead 312 which in turn is coupled to the center tap of the winding 298. The winding 116 has coils 877 and 879 to provide cancellation of the driving fields. The read-write coil 176 is shown to indicate that the corresponding read-write coils of each bank are serially coupled. The resistor 880 is also coupled through a resistor 881 to the collector of a transistor 882. The emitter of the transistor 882 is coupled to a suitable source of potential such as a −6 volt terminal 883. The base of the transistor 882 is coupled to a lead 885 which in turn is coupled to the lead 666 of the directional flip 668 of FIG. 2 so that the transistor 882 is biased into conduction when the coil 116 is utilized for writing and is biased off when the coil 116 is utilized for reading.

In operation, current flows through the transistor 882 in a zero or reference direction except when reading from the read-write coil 116. Current only flows through the transistor 868 when a "one" is to be written into the wire 36. The read circuit 308 is also coupled to opposite ends of the winding 306 and has a recirculate lead 896 coupled to the write circuit 343.

For reading, the read circuit 338 includes the sense amplifier 339 coupled to the winding 336 and coupled through a lead 904 to an output flip flop 906. The triggered state of the output flip flop 906 is applied through a lead 910 to the computer control system 531, for example, as well as through the recirculate lead 840. The write circuit 343 is coupled through the lead 342 to the center tap of the winding 328 and includes a lead 920 which may be coupled to the computer control system 531, a lead 931 which may be coupled to the lead 864 of the propagation generator circuit 680, and a lead 923 which may be coupled to the lead 670 of the directional flip flop 668 of FIG. 2. Read-write coils 126 and 186 are shown to indicate that corresponding coils of all of the banks are coupled in series as explained relative to FIG. 1.

Thus, for recording of information into the magnetic wire 36 or other wires in corresponding positions such as the wires 56, 66 or 76, during propagation in a first direction from left to right as selected by the setting of the directional flip flop 668 of FIG. 2, the write circuit 313 and the read circuit 338 are utilized. For recording of magnetic domains during propagation in the opposite direction from right to left along the magnetic wire 36, the wire circuit 343 and the read circuit 308 are utilized, this bidirectional operation being performed by the operation of the balanced transformers 300 and 330. Similar read circuits and write circuits are utilized for the other input-output circuit of FIG. 1. The directional flip flop 668 controls transistors in all of the write circuits of the input-output circuits of FIG. 2 such as the transistor 882, so that D.C. current flow is prevented when reading from a read-write coil. When direct coupling is utilized instead of the transformer arrangements in accordance with this invention, the gating of the driving signals by the gates 773, 775, 777 and 779 may not be required.

Figure 4:
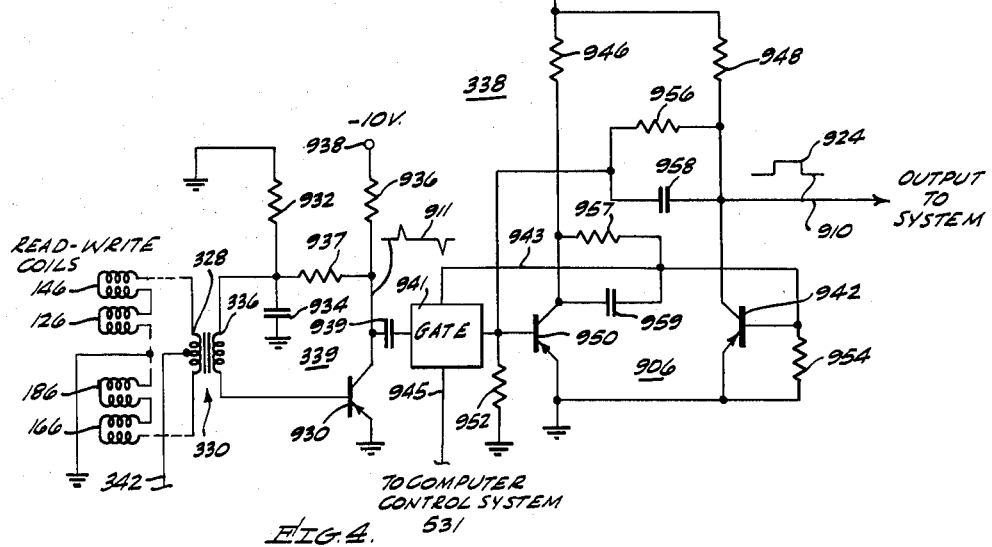
FIG. 4 is a schematic circuit diagram of the read amplifier circuit to be utilized in the system of FIG. 3.

Referring now to FIG. 4, the read circuit 338 will be explained in further detail. The signals induced in the read-write coils such as 126, 146, 166 or 186 control the sense amplifier 339 to set the output flip flop 906 for applying output pulses of a waveform 924 to the lead 910 representing binary information stored and propagated through the magnetic wire 36. It is to be noted that the winding 328 is coupled in a balanced arrangement at one end to ground through 8 coils such as 126 and 146 and at the other end through 8 coils such as 166 and 186 to ground. The signal of the waveform 924 may be at the upper voltage level when a "one" is interrogated and at the lower voltage level when a "zero" is interrogated. The coil 126 which includes two windings is coupled through the windings 328 and 336 of the transformer 330 to the base of a pnp type transistor 930 at one end of the winding 336. The other end of the winding 336 is coupled to ground both through a biasing resistor 932 and a bypass capacitor 934, as well as being coupled through a resistor 937 to the collector of the transistor 930. The emitter of the transistor 930 is coupled to ground and the collector is coupled through a biasing resistor 936 to a suitable source of potential such as a −10 volt terminal 938. The signal developed on the collector of the transistor 930 is applied through a coupling capacitor 939 and a gate 941 to the base of a pnp type transistor 940 of the flip flop 906. The flip flop 906 also includes a pnp type transistor 942 with the emitters of the transistors 940 and 942 coupled to ground and the collectors coupled through respective resistors 946 and 948 to a suitable source of potential such as a −10 volt terminal 950. The base of the transistor 942 is also coupled to the gate 941 through a lead 943.

The bases of the transistors 940 and 942 are coupled to ground through respective resistors 952 and 954. The base of the transistor 940 is coupled to the collector of the transistor 942 through a control circuit including a parallel coupled resistor 956 and capacitor 958. The base of the transistor 942 is also coupled to the collector of the transistor 940 through a parallel coupled resistor 957 and capacitor 959. The output binary signal of the waveform 924 is derived from the collector of the transistor 942 and applied to the lead 910. Because of the opposite polarity relation of the signals in the secondary coil 336 during reading a "one" when reading from one half of the banks such as from the coils 126 or 146, or the other half of the banks such as from the coils 166 or 186, which are connected from opposite ends of the winding 328 to ground, the polarity relation of the waveform 911 is reversed. Thus, a lead 945 controls the gate 941 in response to the computer control system 531 of FIG. 3 or in some arrangements in response to the selection flip flops of FIG. 2. Therefore, the signal of the waveform 924 always has the same polarity for a "one" and the flip flop 906 is always reset to the same state. A gate similar to the gate 941 is provided in each read circuit of FIG. 1.

In operation, the sensed signal is derived from the read coil such as 126 and amplified by the transistor 930 to form a signal of a waveform 911 representing a binary "one" and having a positive pulse followed by a negative pulse for half of the banks. In response to the positive pulse of the waveform 911, the transistor 942 is triggered into conduction to form the output signal of the waveform 924. In response to the negative signal of the waveform 911, the transistor 940 is triggered into conduction to reset the flip flop and terminate the pulse of the waveform 924.

In the other half of the banks, the gate 941 as determined by the bank selection applies an inverted signal of the waveform 911 to the base of the transistor 942. When a "zero" is interrogated by the coil 126, no pulses are formed of the signal of the waveform 911 and the flip flop remains in the reset condition with the lower voltage level of the waveform 924 representing a "zero."

Figure 5:
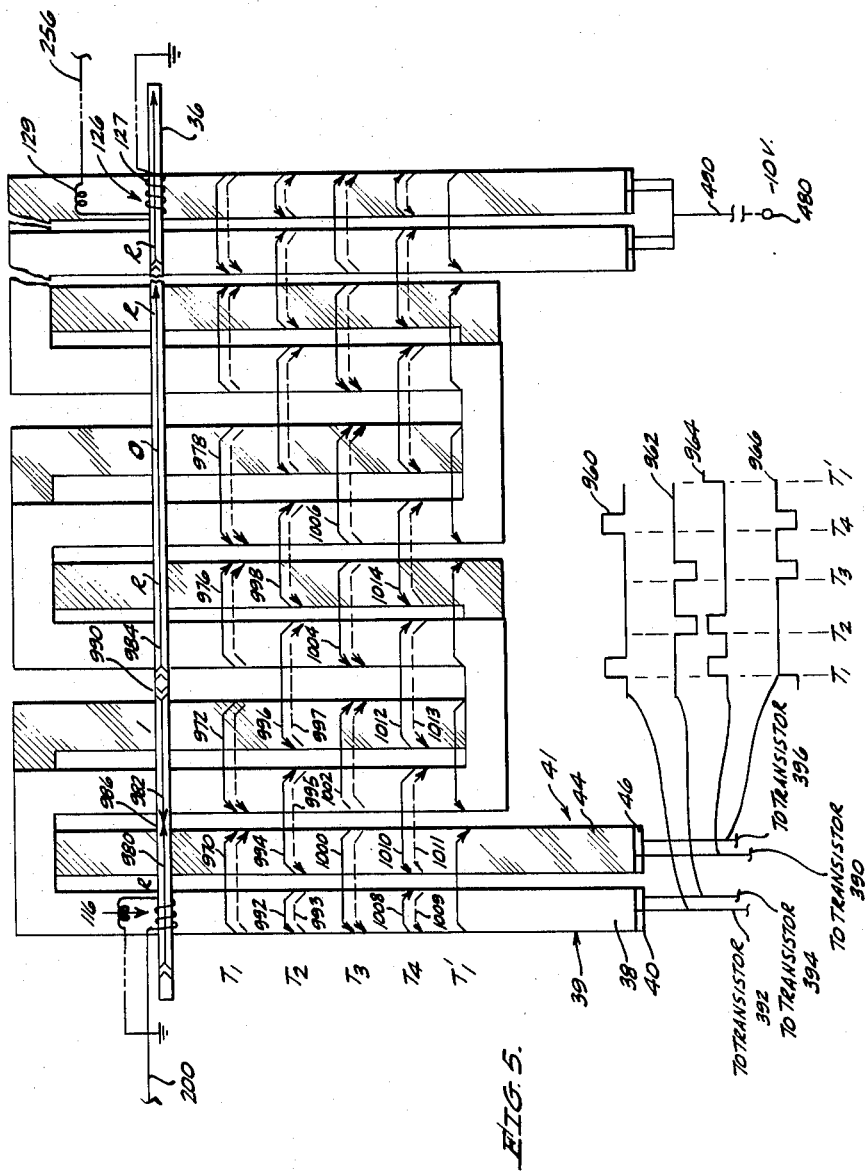
FIG. 5 is a schematic diagram of a shift register wire and the polyphase conductor strips for explaining the propagation of magnetic domains in a selected first or second direction.

Referring now to FIG. 5, the propagation of the magnetic domains along the magnetic wire 36 while maintaining the required spacing relative to one another will be first explained. The propagating conductors 38, 40, 44 and 46 are shown with only the one magnetic wire 36 for convenience of illustration, but it is to be understood that in the operating system of FIGS. 1 and 2, all magnetic shift register wires are subject to the same driving field within each selected bank. The conductors 38 and 40 respond to driving currents of respective waveforms 960 and 962, which combined, effectively form a first phase driving pulse of the waveform 967 (FIG. 8) to develop magnetic fields. As shown in FIG. 3, the gating at the output leads of counters 726 and 734 provides driving pulses such as the waveforms 616 and 614 that substantially prevent saturation of the transformers within the system and also limit the pulse duration to provide a power saving. The conductors 44 and 46 respectively respond to current pulses of waveforms 964 and 966, which combined effectively form a single driving signal of a waveform 969 having a second phase relation in phase quadrature with the other effective driving pulse. The conductors 38 and 40 jointly form a first phase driving arrangement or combined conductor 39 and the conductors 44 and 46 jointly form a second driving arrangement or combined conductor 41. The current pulses of the waveforms 960, 962, 964 and 966 provide fields to propagate magnetic domains from left to right through the wire 36.

At time $T_1$ the driving pulse in the conductors 38 and 40 and the driving pulse of the conductors 44 and 46 are both positive in the first and second segments, to develop a magnetic driving field in a first direction as shown by an arrow 970 and in a second direction as shown by an arrow 972 through the third and fourth segments of the conductors through which current is flowing in the opposite direction from that through the first and second segments. These fields are formed in a similar manner through all segments of the conductors such as indicated by arrows 976 and 978. This spacing is maintained as the domain walls move from a region in the magnetic wire 36 where they are established by the read write coil 116 to a region where they pass through the read write coil 126 and are sensed as output signals. This direction of propagation from left to right is selected by the directional flip flop 668 of FIG. 2.

The magnetic wires such as 36 are stretched or positioned close to the area of the conductors which are arranged similar to the polyphase windings of a motor. Because these conductors are arranged with one alternately leading and lagging the other in position, the two phased currents produce magnetic fields parallel to the wire at different times of the four period cycle and magnetic domains established in the magnetic wire 36 are sequentially propagated therethrough. As the arrows indicate, such as arrows 970, 972, 976 and 978, a driving field encloses a pair of adjacent conductors and is opposite to that which encloses a neighboring pair during any time period. As shown by the wire 36, magnetic domains such as indicated by arrows 980 and 982 are established therein during the propagation operation by current pulses applied to the read-write coil 116. Domain walls such as 986 and 990 may exist between magnetic domains of opposed polarity, and these walls move in response to the propagating fields to positions between adjacent pairs of conductors. It is to be noted at this time that when adjacent magnetic domains have the same polarity relation as shown by the arrow 984, the domain is expanded until a domain wall is formed by an adjacent domain region of opposite polarity. However, during writing periods, the portions of the domains of the arrow 984 are established and propagated during that period with predetermined lengths and the domain is periodically expanded only during the propagation operation. The domain walls or the junction between two magnetic domains of the same polarity will not pass the boundary between adjacent pairs of conductors during a given phase or time period because the neighboring pair of conductors produces a field which opposes its further motion such as indicated by the arrows 970, 972, 976 and 978. If the domain wall is moved to the right, it will stop at a point that during the next time period will be in the middle of the new field, which will cause the domain wall to move one conductor bar to the right.

At time $T_1$ the polarities of the driving currents of the waveforms 960, 962, 964 and 966 are such that the propagating fields of the arrows 970, 972, 976 and 978 may move the magnetic domains to the positions such as shown by the arrows 980 and 982. It is to be noted that at the end of each four cycle period, reference domains are adjacent to the coils 116 and 126 so that information is not destroyed during writing in other selected banks. At time $T_2$ as current of the waveforms 960 and 962 changes direction, the propagating fields are shown in the position of arrows 992, 994, 996 and 998 causing the magnetic domains in the wire 36 to move forward one combined conductor width. At time $T_3$ as current of the waveforms 962 and 966 changes direction, the polarity relation of the polyphase driving currents provides magnetic fields indicated by arrows 1000, 1002, 1004 and 1006 with the magnetic domains such as 980 and 982 again moving one conductor width to the right. Thus, because the fields enclosing an adjacent pair of conductors have opposite polarity relations, the magnetic domains such as 980 are sequentially propagated one conductor width along the wire 36 in response thereto. At time $T_4$ as current of the waveforms 960 and 966 changes direction, the magnetic fields again change polarity as shown by arrows 1008, 1010, 1012 and 1014 moving the magnetic domains such as 980 one conductor width forward. Also at time $T_1'$ in response to the current pulses of the waveforms 960, 962, 964 and 966, the driving fields have a similar polarity relation as at time $T_1$.

During this operation, magnetic domain walls which have propagated along the array to the last conductor pass through the read-write coil 126 to produce an output signal of a waveform 911 (FIG. 4) which may represent a binary "one." Also, when two adjacent domains have the same polarity, an output signal is not developed indicating the opposite magnetic stored state or a binary "zero." It is to be noted that the voltage induced in the read-write coils 126 and 116 by the changing propagating fields is cancelled because the coil 126, for example, has windings 127 and 129 wound with the same number of turns but reversed with respect to each other. This sensing arrangement has been found to provide output signal to noise ratios in excess of 10 to 1.

When propagating magnetic domains in the opposite direction, that is from the read-write coil 126 to the read-write coil 116 as determined by the directional flip flop 668, the current pulses of the waveforms 964 and 966 are inverted to effectively form a combined pulse of a waveform 971 (FIG. 8) and writing is performed at the coil 126. The driving fields at times $T_1$ and $T_3$ have the same polarity relations as shown by the dotted arrows but the driving fields at times $T_2$ and $T_4$ change as shown by dotted arrows 993, 995 and 997 at time $T_2$ and dotted arrows 1009, 1011 and 1013 at time $T_4$. Thus, it can be seen by the dotted arrows that the propagation direction is from right to left moving magnetic domains formed by the coil 126 in the wire 36 one conductor width during each time period.

It is to be noted that when recording during propagation from left to right or in the opposite direction in the wire 36 for example, the direction of the arrows such as 982 and 980 or the polarity relation is the same for a "one" and for a "zero" or a reference as shown in FIG. 5. The coils such as 116 and 126 are wound in the same direction relative to the recording current so that the arrows have a similar direction. Also, regardless of which direction the information is propagated therefrom during reading the polarity of the sensed signal is the same in any one bank or in each half of the banks because the domains of reversed polarity move past the read coil in opposite directions. As shown in FIGS. 1 and 2, the signal of the waveform 911 (FIG. 8) during reading at the windings such as 306 or 338 has the polarity shown for the banks 10, 12, 360, 362, 364, 366, 370 and 372, and an opposite polarity for the banks 14, 16, 374, 376, 380, 382, 384 and 386.

Figure 6:
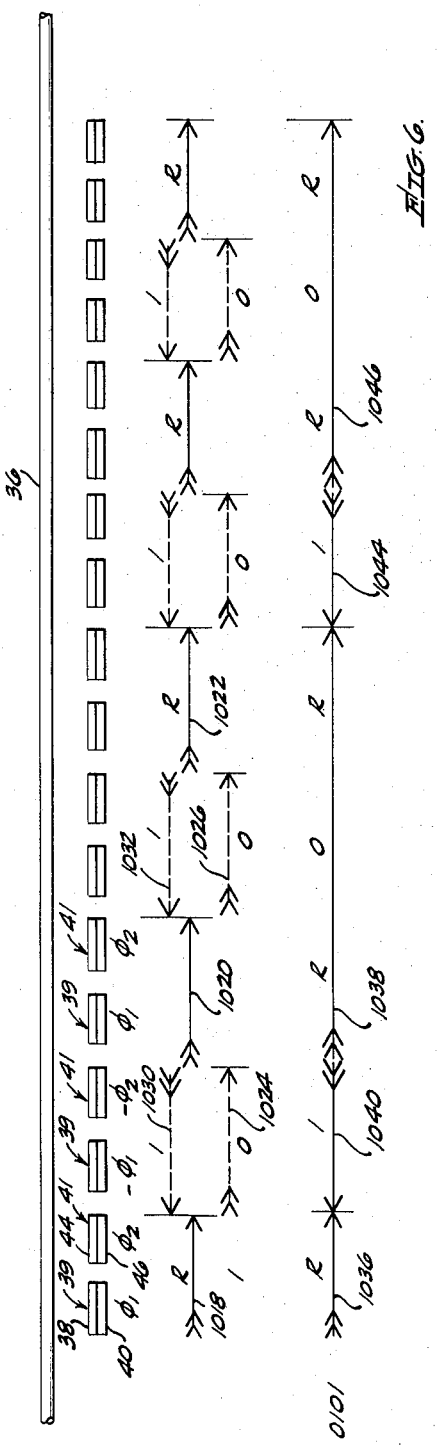
FIG. 6 is a schematic diagram of the magnetic domains that may be stored in a magnetic wire in accordance with this invention.

Referring now to FIG. 6, the arrangement of the magnetic domains in accordance with this invention for storing binary information in each shift register wire such as 36 for the polyphase system will be explained in further detail. The polyphase conductors 38, 40, 44 and 46 are shown in section adjacent to the magnetic shift register 36 forming the combined conductors 39 and 41. In each third and fourth timing periods of the 4 cycle operation, a reference R magnetic domain is established as shown by arrows 1018, 1020 and 1022. During each first and second timing periods, binary information is recorded to form an informational magnetic domain with a "zero" having the same polarity as the reference indicated by arrows 1024 and 1026 and a "one" having a magnetic polarity opposite to the reference as indicated by arrows 1030 and 1032. It is to be noted that this selection of a binary "zero" to have the same magnetic polarity relation to the reference domain is arbitrary and only for purposes of illustrating the system in accordance with this invention. Thus, it can be seen that during each four time cycles of operation, a reference and a binary bit are both written into the magnetic shift register wire 36 as they are propagated forward. Different rules for the arrangement of domains may be used. The one selected is chosen for convenience of illustration.

To illustrate a binary number "0101" recorded by the coil 116 and propagated into the shift register wire 36 either from left to right or from right to left, reference arrows such as 1036 and a portion of an arrow 1038 are shown with an arrow 1040 representing a "one," a portion of the arrow 1038 representing a "zero," an arrow 1044 representing the "one" and a portion of an arrow 1046 representing a "zero." It is to be noted that the reference portion, the "zero" portion and the reference portion of the arrow 1038 are a continuous domain having the same polarity. Because the "zero" has the same polarity of the reference, an output pulse is not developed when propagated past a read-write coil such as shown in FIG. 5 because of the absence of a domain wall. Only in response to a stored "one" providing a domain wall such as between the arrows 1040 and 1038 is an output signal developed in a read coil to represent the interrogation of a binary "one." Also, an output signal is developed when the domain wall between the arrows 1040 and 1036 moves past the read coil. Therefore, in the arrangement of FIG. 6 in accordance with this invention, the presence of a domain wall between a reference domain and an adjacent bit domain is sensed as a "one" and the absence of a domain wall therebetween is sensed as a "zero."

Figure 7:
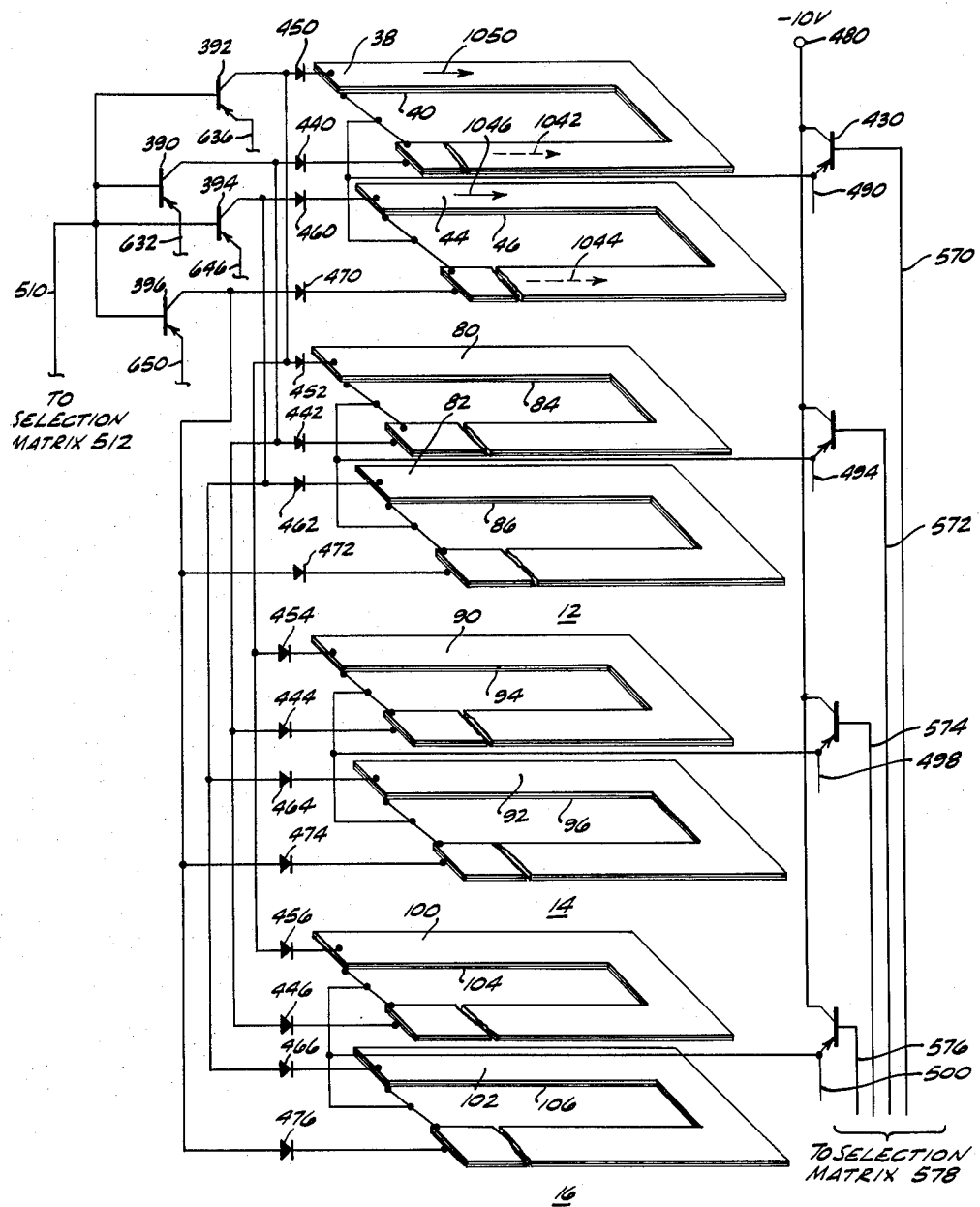
FIG. 7 is a schematic partially perspective drawing for further explaining the operation of the polyphase driving conductors of FIG. 2.

Referring now to the perspective drawing of FIG. 7 as well as to FIG. 2, the operation of propagating magnetic domains in a selected direction and in a selected bank will be further explained. As discussed relative to FIG. 5, the polyphase conductors are arranged so that current flows in both directions through a combined conductor such as the combined conductor 39 formed by conductors 38 and 40. In response to the state of the flip flops 530, 532, 580 and 582 of FIG. 2, a negative potential may be applied to a base lead such as 510 with a positive potential being applied to the base leads 516, 518 and 522 and a negative potential may be applied to a base lead such as 570 with positive potentials being applied to the base leads 572, 574 and 576. As a result, the transistors 390, 392, 394 and 396 are biased to a state close to conduction, as well as the transistor 430 which effectively applies to $-10$ volts of the terminal 480 to lead 490. Referring also to the waveforms of FIG. 8, the pulsed signal of the waveform 614 is applied to the transformer 612 and the pulsed signal of the waveform 616 is applied to the transformer 613. The directional flip flops 668 is set to a state to apply a positive signal to the lead 666 and a negative signal on the lead 670 to effectively energize the secondary winding 642 and provide propagation in a first direction through the magnetic wires which is from left to right in the wires of FIG. 1.

At time $T_1$ in response to the positive potential of the pulse of the waveform 616, a positive signal is applied to the lead 632 and a negative signal is applied to the lead 636 to bias the transistor 390 into conduction and the transistor 392 out of conduction. Thus, current of the waveform 967 (FIG. 8) flows through the conductor 40 as shown by a dotted arrow 1042 and through the transistor 430 to the $-10$ volt terminal 480. At the same time, in response to the positive potential of the pulse of the waveform 614, a positive signal is applied to the lead 650 and a negative signal is applied to the lead 646, causing the transistor 396 to be biased into conduction and the transistor 394 to be rendered non-conductive. Thus, current of a waveform 969 flows from the transistor 396 through the diode 470 and through the conductor 46 as shown by a dotted arrow 1044 and through the emitter to collector path of the transistor 430 to the $-10$ volt terminal 480.

At time $T_2$ the potential of the waveform 614 remains at the high level and the transistor 396 remains conductive with current flowing through the conductor 46 as shown by the dotted arrow 1044. However, at time $T_2$ the potential of the waveform 616 falls to the low level to apply a negative potential to the lead 632 and a positive potential to the lead 636, which in turn biases the transistor 392 into conduction and the transistor 390 out of conduction. As a result, current flows from the transistor 392 through the diode 450, through the conductor 38 as shown by an arrow 1050 and through the emitter to collector path of the transistor 430 to the $-10$ volt terminal 480. Thus, at time $T_2$ the current direction has reversed in the first polyphase conductor 39 to effectively provide an alternating current of the waveform 967, which in turn effectively reverses the magnetic field formed by the conductor 39.

At time $T_3$ the driving signal of the waveform 616 remains at the low voltage level while the driving signal of the waveform 614 falls to the low potential level biasing the transistor 396 out of conduction and the transistor 394 into conduction. As a result, current flows from the transistor 394 through the diode 460, through the conductor 44 as shown by an arrow 1046, and through the emitter to collector path of the transistor 430 to the $-10$ volts of the terminal 480. Thus, current flow is terminated through the conductor 46 as shown by the arrow 1044 and current flow is initiated in the opposite direction through the conductor 44.

At time $T_4$ the signal of the waveform 614 remains unchanged and the driving signal of the waveform 616 rises to the upper potential level to apply a positive potential to the lead 632 and a negative potential to the lead 636. As a result, the transistor 390 is biased into conduction and the transistor 392 is rendered non-conductive. Thus, current flows from the transistor 390 through the diode 440 and through the conductor 40 as shown by the dotted arrow 1042 and to the −10 volt terminal 480. At time $T_1'$ the potential of the waveform 616 remains unchanged and the potential of the waveform 614 rises to the upper level to apply a positive potential to the lead 650 and a negative potential to the lead 646, which in turn biases the transistor 396 into conduction and the transistor 394 out of conduction. The transistor 396 conducts current through the diode 470, through the conductor 46 as shown by the dotted arrow 1044 and through the emitter to collector path of the transistor 430 to the −10 volt terminal 480.

Thus, it can be seen that the driving current through the conductors 38 and 40 is effectively as shown by the waveform 967 and the driving current through the conductors 44 and 46 is effectively as shown by the waveform 969. The conductors are arranged in accordance with this invention so that current flows in a single direction during alternate periods through each conductor to provide the alternating square driving pulses.

Figure 8:
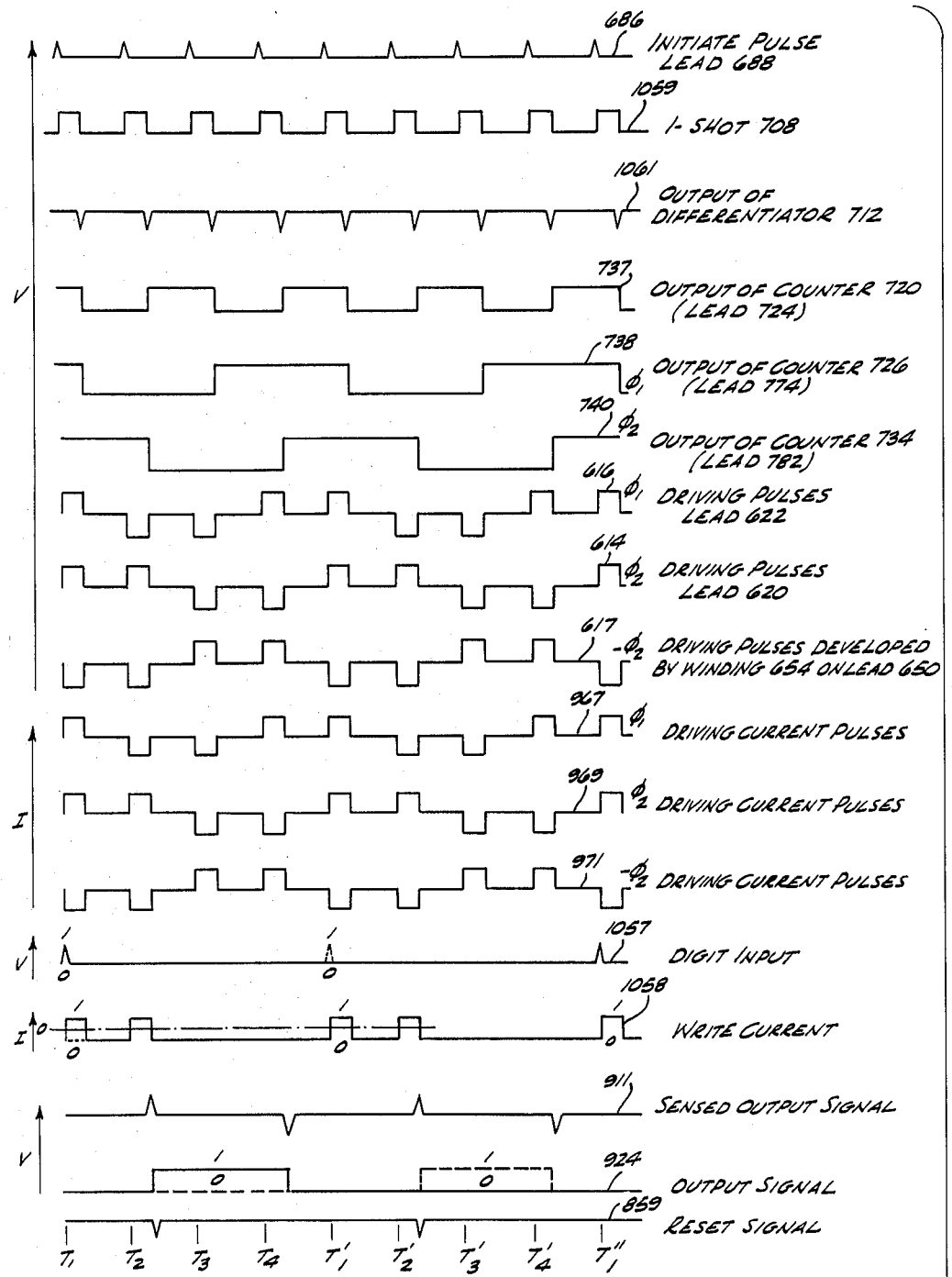
FIG. 8 is a diagram of waveforms for explaining the operation of the shift register system in accordance with this invention.

In order to reverse the direction of propagation in accordance with this invention, the driving current in one of the combined pair of polyphase conductors which may be the conductors 44 and 46 is inverted while the phase relation of the other driving current in the conductors 38 and 40 remains unchanged. Thus, by triggering the directional flip flop 668 to the opposite state so that a negative potential is applied to the lead 666 and a positive potential is applied to the lead 670, the winding 654 is effectively energized. At time $T_1$, in response to the positive potential of the waveform 614, a positive signal is applied to the lead 646 and a negative signal is applied to the lead 650 through respective diodes 658 and 662. A waveform 617 of FIG. 8 shows the driving pulses developed by the winding 654 on the lead 650 which are inverted relative to the pulses of the waveform 614. As a result the transistor 394 is biased into conduction and the transistor 396 is biased out of conduction so that current flows through the conductor 44 as shown by the arrow 1046. At the same time, in response to the signal of fixed phase relation of the waveform 616, the transistor 390 is biased into conduction so that current flows through the conductor 40 as shown by the dotted arrow 1042. At time $T_2$ the signal of the waveform 616 falls in potential to apply a negative potential to the lead 632 and a positive potential to the lead 636. As a result, the transistor 392 is biased into conduction and the transistor 390 is rendered non-conductive, and current flows through the conductor 38 as shown by the arrow 1050. At time $T_3$ the potential of the waveform 616 remains unchanged and the potential of the waveform 614 falls in level so that the transistor 396 conducts current of the dotted arrow 1044 through the conductor 46. At time $T_4$ the signal of the waveform 616 rises in potential so that a positive signal is applied to the lead 632 to bias the transistor 390 into conduction and pass current of the dotted arrow 1042 through the conductor 40. Thus, in response to the selection of direction of propagation of the magnetic domain by emergizing the winding 654, the current pulses of the combined conductors 44 and 46 is inverted as shown by the waveform 971. It is to be noted that the phase relation of the current pulses of the waveform 967 flowing through the conductors 38 and 40 remains unchanged. Because of the inversion or the 180 degree phase shift of the one driving pulse, the propagating force is effectively in the opposite direction from right to left as explained relative to FIG. 5. The driving currents and fields are applied only during the pulsed periods after each timing interval in accordance with this invention to prevent saturation of transformers and to save power.

It is to be noted that the unselected banks are unaffected by the changes of potential at the emitters of the transistors 390, 392, 394 and 396 because the transistors 432, 434 and 436 are biased out of conduction at their bases.

As may be seen in FIG. 5, the driving field or propagating fields at each combined conductor such as the conductors 38 and 40 and the conductors 44 and 46 changes direction during alternate time periods of the four cycle timing operation. Thus, at time $T_1$ the field as shown by the arrow 970 at the conductors 38 and 40 is to the right, is to the left at time $T_2$ as shown by the arrow 992, is to the left as shown by the arrow 1000 at time $T_3$, and is to the right as shown by the arrow 1008 at time $T_4$. Thus, the driving force to a field of opposite polarity shifts one combined conductor width during each timing interval. The driving forces change in a similar manner for propagating magnetic domains from right to left. It is to be noted that the requirement for propagation is that the driving fields be of opposite polarity and is equally effective between the arrows 970 and 972 as between the arrows 972 and 976.

Referring now to FIG. 3 as well as to the waveforms of FIG. 8, the operation of the control system in accordance with this invention will be explained in further detail. At time $T_1$ in response to a digital input signal applied from the computer control system 531 to the lead 825, information may be introduced to record binary information on the shift register wires such as 36. For recording the new information, a positive signal of a waveform 1057 is applied to the "and" gate 820 on the lead 825 from the computer control system 531. A continuously positive signal is also applied to the lead 824 for recording new information. For recirculation, a continuously positive signal of a waveform 839 is applied from the computer control system 531 through the lead 838 to the "and" gate 836 with the recirculate information applied to the "and" gate 836 through the lead 840. It is to be noted that the leads 824 and 838 also control the other read circuits of the system so that information may be new or recirculated as selected by the computer control system 531. The four cycle timing control may be performed by a single initiate pulse at times such as $T_1$ and $T_1'$ similar to the waveform 686 when the switch 705 is closed or by continuous initiate pulses of the waveform 686 at each time period when the switch 705 is open. At time $T_1$ the initiate pulse of the waveform 686 is applied to the one-shot flip flop 708 to form an output signal of a waveform 1059, the trailing edge of which is differentiated in the differentiator 712 to form the signals of the waveform 1061. In response to this differentiated signal of a waveform 1061, the binary counter 720 is initiated into a counting cycle to form pulses of a waveform 737 which automatically control the counters 726 and 734. As a result, square pulses as shown by the waveforms 738 and 740 are formed on the leads 774 and 782. Inverted pulses may also be formed on the leads 772 and 780. The gating action of the "and" gates 773, 775, 777 and 779 forms the voltage pulses similar to the waveforms 614 and 616 at the output leads of respective "and" gates 775 and 779. In the arrangement shown, the amplifiers 778 and 786 may be center tapped transformers to apply the driving pulses of the waveforms 614 and 616 on the leads 622 and 620.

It is to be noted that the counter output pulses of the waveforms 738 and 740 are formed after the times such as $T_1$ by a period equal to the width of the pulses of the waveform 1059 as formed by the one shot flip flop 708. Because the pulses of the waveform 1059 gate the signals of the waveforms 738 and 740, the last portion of each pulse of the waveform 738 and 740 is reliably gated.

To further explain the operation of the propagation generator 680, between times $T_1$ and shortly after time $T_3$, one or both of the signals of the waveforms 737 and 740 have a negative value to pass a signal through the "or" gate 750 and in coincidence with the differentiated signal of the waveform 1061 to pass a signal through the "and" gate 760. When the switch 705 is closed, a recirculated initiate pulse is applied from the "and" gate 760 to the "or" gate 706 to initiate the operation of the one shot flip flop 708 shortly after times $T_1$, $T_2$, $T_3$. However, shortly after time $T_4$, both pulses of the waveforms 737 and 740 are positive so that a signal is not applied through the "or" gate 750 and the four period cycle is only again started by an initiate pulse at time $T_1'$ applied to the lead 688. It is to be noted that for some types of computer operation, a continuous train of initiate pulses of the waveform 686 may be preferable and the switch 705 may be opened.

Shortly after times $T_1$ and $T_2$, in response to an inverted form of the signal of the waveform 740 being applied to the diode 876, a write current shown by a waveform 1058 may be passed through the read-write coil 116 for a short period for writing a "one." It is to be noted that because the coil 116 is utilized for recording, a positive signal from the lead 666 of FIG. 2 is applied to the transistor 882 to maintain that transistor biased into conduction. If a "one" of the waveform 1057 has been previously introduced on the lead 825 or recirculated on the lead 840 to trigger the input flip flop 852 to a "one" state, at times $T_1$ and $T_2$ current flows in the direction through the winding 116 indicated by an arrow 1041 and shown by the waveform 1058. Thus, a magnetic domain in the "one" direction is jointly established shortly after times $T_1$ and $T_2$ as the domains are propagated one conductor width at each time interval along the wire such as 36. However, if a "zero" has been introduced from the computer control system 531, the transistor 868 is not biased into conduction and the steady state current indicated by an arrow 1073 flows through the coil 116 to write a "zero" which has the same polarity as the reference domain. The current remains at the same lower level as shown by the waveform 1058. In response to each pulse of the waveforms 616 and 617, the magnetic domains are simultaneously established and propagated forward the width of one combined conductor segment. It is to be noted that when writing into the coil 116, the coils such as 176 may record in the wires to which propagating fields are not applied. However, the conductors are arranged so that a reference domain is positioned under the read-write coils at both ends of the magnetic wires so that if "ones" are written into those domains, a reference domain is rewritten at the end of each four cycle period. Also, in some arrangements a "one" may be written by the combination of a write field and a propagating field of the same polarity at times $T_1$ and $T_2$ so that the reference domains adjacent to the read-write coils in unselected banks are unaffected.

As the magnetic domains are propagated along the wires such as 36, a pulse representing a "one" as shown by the waveform 911 is sensed by the read write coil 126 shortly after time $T_2$, for example, this pulse resulting from a domain wall passing through the field of the coil 126. If a binary "zero" is being sensed, the absence of a signal of the waveform 917 results from the absence of a domain wall in that portion of the propagated domains. In response to the signal of the waveform 917, the output flip flop 906 may be triggered to a positive state representing a "one" as shown by the waveform 924. This signal on the lead 910 is then applied to the computer control system 531 to be utilized therein or is applied through the lead 840 for recirculation. It is to be noted that for one half of the banks of FIG. 2, the signal of the waveform 911 is inverted in polarity but is applied to the opposite side of the flip flop 906 as controlled by a signal on the lead 945. Shortly after time $T_4$ as the opposite end of a "one" domain is propagated through the coil 126, a signal of a negative polarity as shown by the waveform 911 is sensed to reset the output flip flop 906. For sensing at the coil 126, the signal on the lead 670 of the directional flip flop 668 is applied to the write circuit 343 through the lead 923 to bias a transistor similar to the transistor 882 out of conduction and prevent D.C. current from passing through the reading coil.

At times $T_3$ and $T_4$, a reference domain is again recorded in the wire 36 by the current flowing continuously through the transistor 882 during the propagation operation. At times $T_1'$ and $T_2'$ a "zero" or a "one" may again be written into the wire 36 as the domains are propagated forward. Also, in a similar manner at times $T_2'$ and $T_4'$, a "one" or a "zero" may be sensed by the read write coil 126 to control the output flip flop 906. This operation continues through time $T_1''$ in a similar manner and will not be discussed in further detail.

Figure 9:
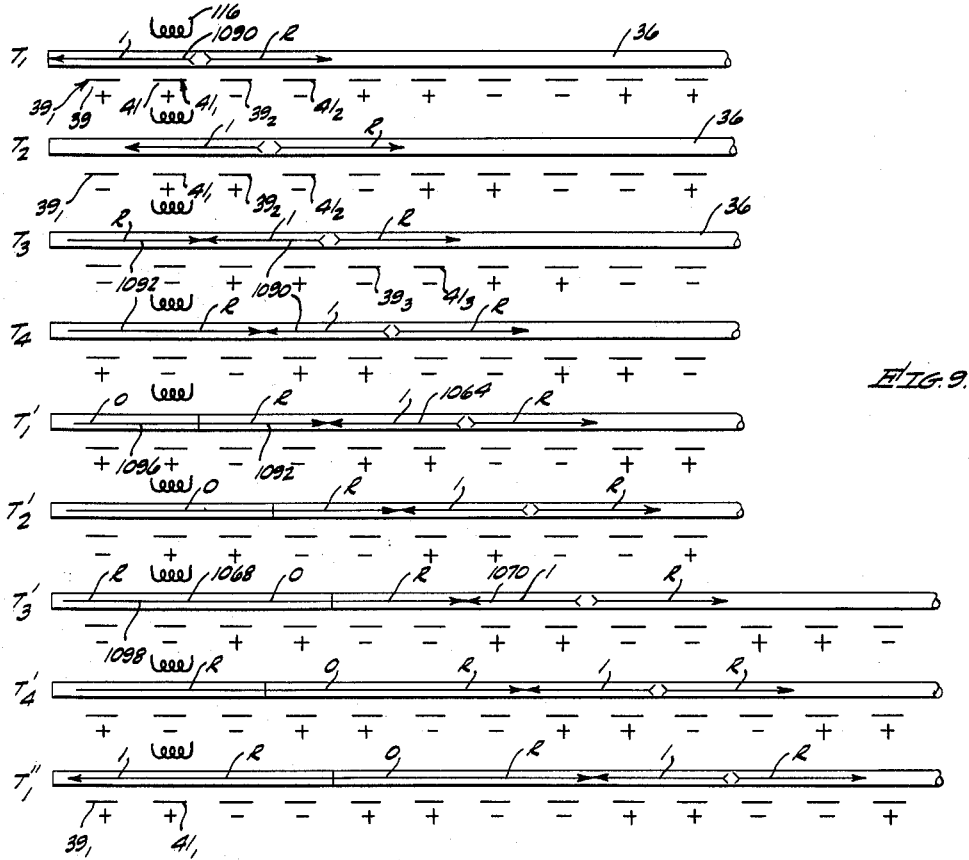
FIG. 9 is a schematic diagram of a magnetic shift register wire utilized in the system of FIGS. 1 and 2 for explaining the sequence in a selected shift register wire of writing, storing and propagation of magnetic domains having magnetic polarity relations representative of binary information.

In order to further clarify the operation of the system in accordance with this invention, reference will be made to FIG. 9 as well as to FIG. 8 for explaining the timing of the propagation operation at the recording end of the magnetic wire 36. It is to be noted that the operation is similar for propagation in both directions and FIG. 9 shows only the propagation of the magnetic domains from left to right along the magnetic shift register wire 36 when recording with the read-write coil 116. For purposes of explanation, the positions of the magnetic domains of FIG. 9 are shown at each time such as $T_1$ after the propagation has taken place in response to the driving current pulses at that time period. At time $T_1$ the armature driving pulses of the waveforms 967 and 969 develop a positive current in the segment $39_1$ of the combined conductor 39 and in the segment $41_1$ of the combined conductor 41. Also, at time $T_1$ a minus current is developed in the segments $39_2$ and $41_2$ of the respective combined conductors 39 and 41. It is to be noted that the fields developed by the conductors 39 and 41 are applied not only to the magnetic wire 36 of the selected bank, but also to the magnetic wires 30, 32 and 34 of FIG. 1. At time $T_1$ a magnetic domain 1090 is recorded in the wire 36 having a polarity relation of a "one," that is with an arrow pointing to the left in response to the write current of the waveform 1058. A reference domain R has been previously established in the wire 36 and has been maintained under the coil 116 after a previous cycle. This "one" domain expands in length until it is held adjacent to the conductor segments $39_1$ and $41_1$. It is to be noted that the driving or propagating current is less than required to establish a domain so that once a domain is established the domain is propagated without a change of magnetic orientation. Because the conductor segment $39_2$ develops an opposing field, the tail of the reference arrow and the arrow 1090 from a domain wall which ends at a point between the segments $41_1$ and $39_2$. This condition developed shortly after time $T_1$ is maintained until time $T_2$.

In response to the armature driving pulse of the waveform 967 changing to a minus current at time $T_2$, a minus current flows through the conductor $39_1$, a positive current flows through the conductor $41_1$, a positive current flows through the conductor $39_2$, and a negative current flows through the conductor $41_2$. Shortly after time $T_2$, the record current of the waveform 1058 passes through the read-write coil 116 so that the "one" polarity is maintained in the wire 36. The opposing fields of the conductors $39_1$ and $41_1$ as well as the opposing fields of the conductors $39_2$ and $41_2$ move the "one" domain to a position adjacent to the conductors $41_1$ and $39_2$. It is to be noted that the domain was propagated forward a distance equal to the width of one conductor or one phase length at time $T_2$.

At time $T_3$ the conductor segment $41_1$ changes to a negative current, the segment $41_2$ changes to a positive current in response to the polarity change of the waveform 969, and the segment $41_3$ changes to a negative current with the currents in the segments $39_1$, $39_2$, and $39_3$ remaining the same. A reference R of an arrow 1092 is recorded at time $T_3$ by the reverse current level of the waveform 1058 which develops a magnetic state opposite to the "one" arrow. The domain arrow 1092 is held adjacent to the conductor segments $39_1$ and $41_1$. The edge of the digit domain indicated by the tail of the arrow 1090 is propagated to a position between the conductor segments $41_2$ and $39_3$ at time $T_3$ where it is opposed by the field of the segment $39_3$.

At time $T_4$ the conductor segment $39_1$ changes to a positive current, the conductor segment $39_2$ changes to a negative current, and the conductor $39_3$ changes to a positive current. Another portion of the reference arrow 1092 is recorded at time $T_4$. The "one" domain of the arrow 1090 is propagated forward one segment width.

At times $T_1'$ and $T_2'$ a binary "zero" may be recorded as shown by an arrow 1096. The domain formed by the arrows 1092 and 1096 is effectively continuous because no domain wall is formed between adjacent domains of the same polarity.

Similar to the discussions above, the sequence of operation continues between times $T_3'$ and $T_4'$. At times $T_3'$ and $T_4'$, a reference domain may be established in response to the current of the waveform 1058 as shown by an arrow 1098 which effectively joins with the domains 1092 and 1096. At time $T_1''$ a "one" may be recorded in the wire 36. As this writing or recording sequence continues in a similar manner, it will not be explained in further detail.

Thus, during recording or writing, as well as during establishing reference domains, the information is propagated a distance along the wire 36 and through other wires of the selected bank at each period in steps substantially equal to the width of a conductor segment. Recording or writing is performed at times $T_1$ and $T_2$ of each four period cycle. When more than one magnetic state representing a "zero" or reference R are sequentially recorded, an expanded domain is formed and when a "one" is recorded, a separate domain is established.

Figure 10:
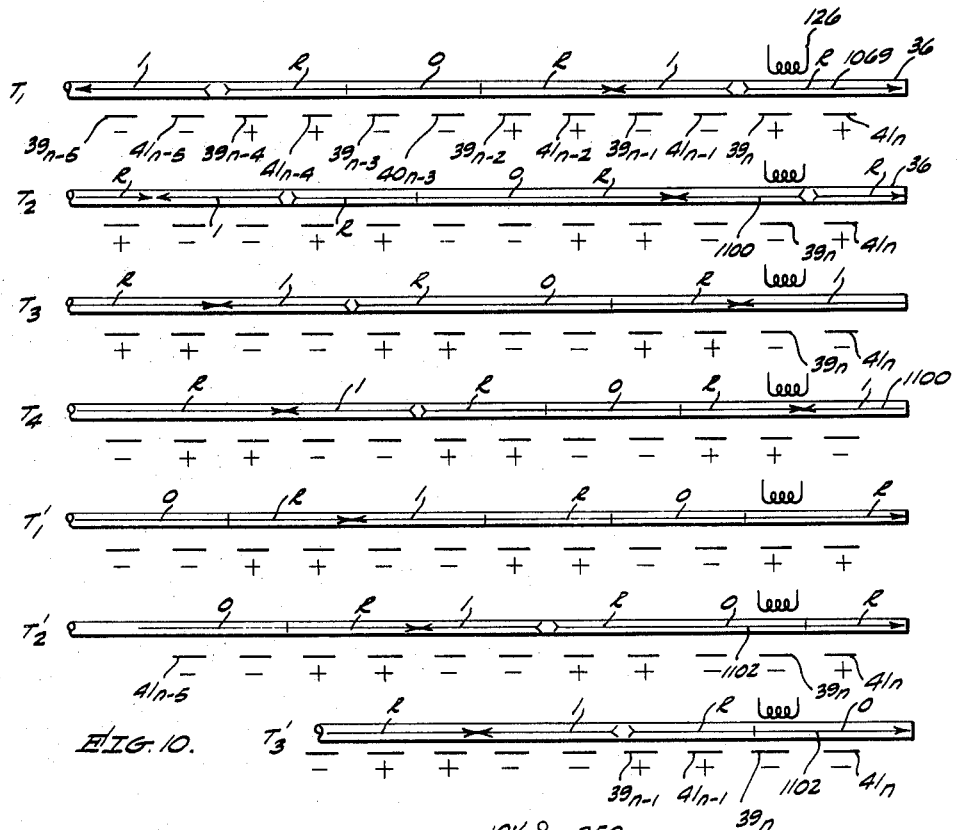
FIG. 10 is a schematic diagram of a magnetic wire utilized in the system of FIGS. 1 and 2 for explaining the sequence of propagation and reading of the binary information contained in the magnetic domains thereof.

Referring now to the schematic diagram of FIG. 10, the reading operation will be explained from the magnetic wire 36. The position of the domains at each time such as $T_1$ are shown after the propagation operation has been performed in response to the propagating current at that time. It is to be noted that the position of the magnetic domains previous to that shown at time $T_1$ is such that a reference domain of an arrow 1069 is adjacent to the coil 126 as the domain expands to the end of the wire 36. This insures that information has not been destroyed during other writing operations when propagating from right to left in other banks. The read-write coil 126 is shown in a position to correspond to the pulses of the waveforms of FIG. 8 in which reading is performed shortly after time $T_3$. It is to be noted that other positions of the read-write coils may be utilized in accordance with the principles of this invention. Also, for simplicity of explanation, it is assumed that a similar 101 binary combination written into the wire 36 as explained in reference to FIG. 9 was written therein many cycles previous to $T_1$. For sensing a "one," the coil 126 develops a positive pulse as shown by the waveform 911 when a "one" domain moves past the coil 126, that is the domain wall between a reference domain and a "one" domain is propagated adjacent to the coil 126. As discussed above, a negative pulse is developed for magnetic wires in the other half of the plurality of banks. A negative pulse as shown by the waveform 911 is developed when the moving domains under the coil 126 change from a "one" to a reference R. At time $T_1$ the reference domain of the arrow 1069 is propagated adjacent to the coil 126. At time $T_2$ the tail of the reference domain of the 126. At time $T_2$ the tail of the reference domain of the arrow 1069 is propagated past the coil 126 and the "one" domain of an arrow 1100 is adjacent to the conductors $39_n$ and $41_{n-1}$. The subscript $n$ may represent the number of segments of each conductor in the bank 10. Thus, a positive signal of the waveform 911 is applied to the sense amplifier 339 to trigger the output flip flop 906 to a "one" state. The propagation at each time period is similar to that discussed above in response to the current pulses of the waveforms 967 and 969. At time $T_3$ all segments of the combined conductor 41 change current direction and all domains are propagated forward approximately the width of one conductor. Also at time $T_4$, all segments of the conductor 39 change current direction and the domains are propagated one more step along the wire 36. Shortly after time $T_4$, the "one" domain of the arrow 1100 moves past the coil 126 followed by a reference domain so that a negative pulse of the waveform 911 is sensed by the coil 126. Thus, the flip flop 906 is triggered to the opposite state or "zero" state and the output signal of the waveform 924 falls to the low voltage level. It is to be noted that the read pulses of the waveform 960 occur subsequent to time $T_2$ and $T_4$ as determined by the speed of propagation of the domains. At times $T_1'$ and $T_2'$, the domains are propagated one step forward shortly after each time. Shortly after time $T_2'$, a "zero" domain of an arrow 1102 is propagated past the coil 126 but because of the absence of a domain wall, a signal is not sensed by the coil 126 and the flip flop 906 remains in the reset or zero state. The domains are propagated sequentially forward along the wire 36 in a similar manner and will not be explained in further detail. Thus, binary information is read from the wire 36 as the domains are continually propagated therealong. It is to be noted that the magnetic domains are propagated to the end of the wire 36 where they collapse and disappear as the fields formed by the conductors 39 and 41 change direction. Propagation in the opposite direction through the magnetic shift register wire 36 occurs in a similar manner when selected by the directional flip flop 668 of FIG. 2.

In accordance with this invention by utilizing relatively small conductor widths and small diameter ferromagnetic wires, domain lengths as small as 0.060 inch will store and propagate information satisfactorily. It has been determined that in nickel-iron wires one thousandth of an inch in diameter, the speed of propagation may be controlled as a function of field strength by the propagation speeds of approximately 1200 to 3600 feet per second. The range of magnetomotive force to provide this change of speed has been found to be approximately 10 to 1. The magnetic wires in accordance with this invention are stressed to within 80 percent of the elastic limit so that the magnetic domains are properly oriented parallel to the axes of the wire and reliably propagate therealong. It is believed that this tension provides positive magnetostructive properties which provide a tendency to orient along the direction of tension.

The bidirectional propagation operation in accordance with this invention allows rapid access to information serially recorded in a magnetic shift register wire such as 36. For example, for storage of coded data, the programmer may keep a record of the relative positions of each group of information bits and program the direction of propagation to bring the desired block to the nearest end.

Figure 11:
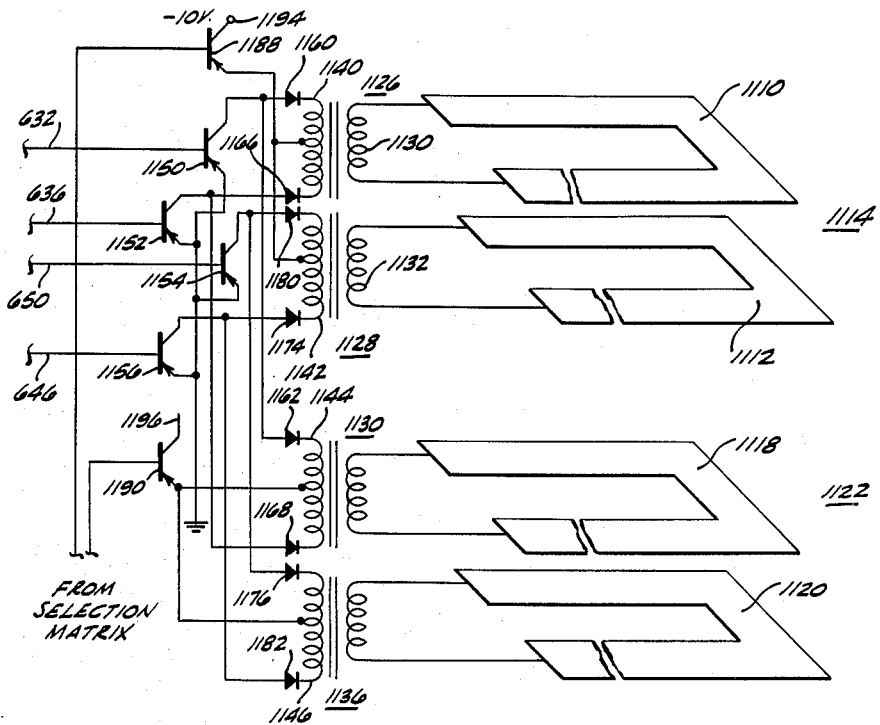
FIG. 11 is a schematic circuit diagram of another arrangement of polyphase driver conductors in accordance with this invention.

Another arrangement of the polyphase driving conductors in accordance with this invention is shown by the partially perspective drawing of FIG. 11. In the arrangement of FIG. 2, two conductors are provided for each phase arrangement so that current flows in only one direction through each separate conductor. In the arrangement of FIG. 11, first and second conductors 1110 and 1112 are provided for a bank 1114 and first and second conductors 1118 and 1120 are provided for a bank 1122. Thus, the push pull driving system of FIG. 2 may be replaced by single conductors in each phase which are driven by the secondaries of transformers with primaries that are driven in a push pull manner. It is sometimes more economical to use the transformer and single conductor per phase rather than the double conductors. In addition, this system permits an advantageous matching of the impedance of the source and the load.

The banks 1114 and 1122 may correspond to the banks 10 and 12 of FIG. 2 and each include similar magnetic wires. Transformers 1126 and 1128 respectively have first windings 1130 and 1132 with opposite ends coupled ends of the conductors 1110 and 1112. Also, transformers 1134 and 1136 have respective first windings coupled to opposite ends of the conductors 1118 and 1120 of the bank 1122. The transformers 1126, 1128, 1134 and 1136 have respective second windings 1140, 1142, 1144 and 1146. Transistors 1150, 1152, 1154 and 1156, which may be of the pnp type, are provided with the emitters thereof coupled to ground. The collector of the transistor 1150 is coupled through respective diodes 1160 and 1162 to first ends of the windings 1140 and 1144 and the collector of the transistor 1152 is coupled through diodes 1166 and 1168 to second ends of windings 1140 and 1144. Also, the collector of the transistor 1156 is coupled through respective diodes 1174 and 1176 to first ends of windings 1142 and 1146, and the collector of the transistor 1156 is coupled through respective diodes 1180 and 1182 to second ends of the windings 1142 and 1146. The bases of the transistors 1150, 1152, 1154 and 1156 are respectively coupled to the leads 632, 636, 650 and 646 of FIG. 2 for responding to the polyphase driving signals.

Selection of a bank is provided by pnp transistors 1188 and 1190 having collectors coupled to respective sources of potential such as —10 volt terminals 1194 and 1196 and having bases responsive to a suitable selection matrix (not shown). The emitter of the transistor 1188 is coupled to a center tap of the second windings 1140 and 1142, and the emitter of the transistor 1190 is coupled to a center tap of the second windings 1144 and 1146.

In operation, selection of banks in the arrangement of FIG. 11 is provided by applying a negative signal to the base of either the transistor 1188 or 1190, which effectively applies a negative potential to the center tap of the windings 1140 and 1142 when the bank 1114 is selected, for example. The polyphase driving signals as discussed relative to FIG. 2 are then applied to the bases of the transistors 1150, 1152, 1154 and 1156 which in phase quadrature pass current in opposite directions through each of the conductors 1110 and 1112 to provide the polyphase driving currents similar to the waveforms 967 and 969 of FIG. 8, for example. Thus, in the arangement of FIG. 11 utilizing a simplified selection arrangement, transformers are provided for passing the current in opposite directions through each of the two polyphase conductors in a selected bank. It is to be noted that the arrangement of FIG. 11 may be similar for smaller arrays than the arrangement of FIG. 2 while the selection at both ends of the conductors may be preferable in large arrays.

Figure 12:
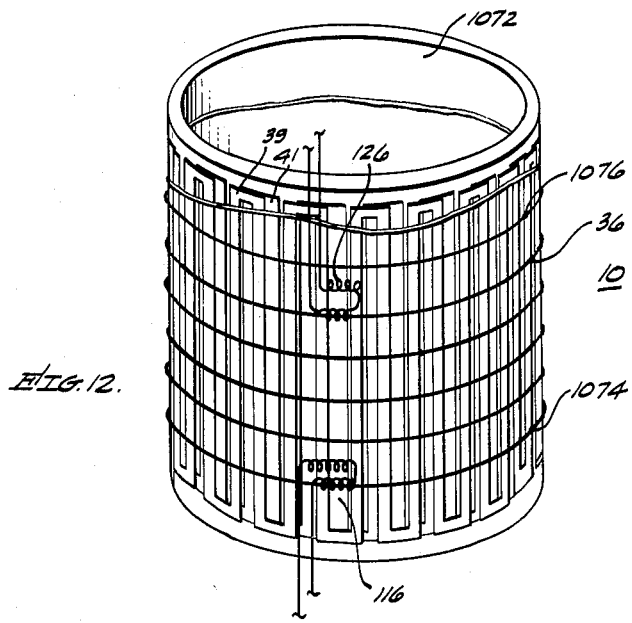
FIG. 12 is a schematic perspective drawing of an assembled arrangement of the shift register system in accordance with this invention.

One structural arrangement in accordance with this invention as shown in FIG. 12 provides the two phase conductor array such as the combined conductors 39 and 41, each including two conductive portions, arranged around a structural cylinder 1072. The magnetic shift register wire such as 36 is then wound in a helix around the conductors 39 and 41. The read-write coils 116 and 126 are then slipped over the wire 36 near each end. The ends of the wire 36 are shown firmly attached to the cylinder 1072 at points 1074 and 1076, so that the required tension is maintained in the wire 36. The cylinder 1072 and the propagating conductors 39 and 41 also include magnetic wires 30, 32 and 34 (not shown) to form the complete bank 10 of FIG. 1. The configuration of FIG. 12 provides endless propagating conductors which will accommodate very large capacity shift registers in a relatively small space. It is to be noted that the arrangement of FIG. 12 is only shown as an example and other arrangements may be utilized in accordance with this invention.

Thus, there has been described a magnetic shift register memory system in which information may be randomly obtained by selection of the propagating conductor arrays. Because of the speed of propagation of the magnetic domains, high speed operation is obtained. Also, because of the arrangement in accordance with this invention to provide propagation in a selected direction through selected magnetic shift register wires, rapid access is provided to selected portions of information. Because of the improved features in accordance with this invention, a relatively small and simple high speed memory system is provided.

What is claimed is.

1. A magnetic shift register system comprising a plurality of propagating conductor array means each array means having a different elongated magnetic storage medium associated therewith for storing magnetic regions with a direction of magnetization substantially parallel to the longitudinal axis of said storage medium and retaining said magnetic regions when propagated therealong, said propagating conductor array means propagating said magnetic regions along said medium when energized, a selected one of said conductor array means being energized during an operating period, a common input conductor and a common output conductor respectively coupled to first and second positions of each of said storage mediums to form a common input path, and a common output path, writing means coupled to said common input conductor for establishing said magnetic regions in said storage medium, and reading means coupled to said common output conductor for responding to said magnetic regions being propagated therealong.

2. A system for propagating magnetic domains sequentially through magnetic mediums in a first or second selected direction comprising a plurality of propagating arrays each including first and second polyphase conductor means positioned alternately adjacent to each other and substantially at right angles to the magnetic medium, a source of first and second driving signals in phase quadrature with each other, selection means coupled to said first and second polyphase conductor means of said plurality of arrays for providing a path for said first and second driving signals to the polyphase conductor means of a selected array, and direction control coupled between said source of driving signals and said selection means for applying at the selected array said first driving signal to said first polyphase conductor means and said second driving signal or an inverted form of said second driving signal to said second polyphase conductor means, thus selecting the direction of propagation of the magnetic domains in a selected array.

3. A magnetic shift register memory system comprising a plurality of propagating conductor arrays, a plurality of magnetic wires associated with each conductor array, propagating means coupled to said plurality of propagating conductor arrays for energizing a selected conductor array during an operating period to propagate magnetic domains through the wires associated therewith, a plurality of first coils magnetically coupled to a first end of each of said magnetic wires, a plurality of second coils magnetically coupled to a second end of each of said magnetic wires, a plurality of first input-output means each coupled in common to a different first coil of each of said plurality of arrays, a plurality of second input-output means each coupled in common to a different second coil of each of said plurality of arrays, whereby only a selected propagation array is energized during an operating period and said input-output means perform reading and writing from only the energized conductor array.

4. A magnetic shift register memory system comprising a plurality of propagating conductor arrays, a plurality of magnetic wires associated with each conductor array, a source of propagating signals coupled to said plurality of propagating conductor arrays for energizing a selected conductor array during an operating period to propagate magnetic domains through the magnetic wires associated therewith, directional control means coupled to said source of propagating signals for controlling said propagating signal to propagate magnetic domains in a selected direction, a plurality of first coils magnetically coupled to a first end of each of said magnetic wires, a plurality of second coils magnetically coupled to a second end of each of said magnetic wires, a plurality of first input-output means each coupled in common to a different first coil of each of said plurality of arrays, a plurality of second input-output means each coupled in common to a different second coil of each of said plurality of arrays, said directional control means coupled to said first and second input-output means, whereby said first and second or said second and first input-output means respectively perform reading and writing from only the energized conductor array.

5. A shift register system comprising a plurality of banks of polyphase conductor means, a plurality of magnetic wires adjacent to the polyphase conductor means in each of said banks, a source of polyphase driving signals, selection means coupled to said plurality of conductors and to said source of polyphase driving signals for applying said polyphase driving signals to a selected one of said polyphase conductor means, a plurality of writing means each coupled to a first end of a different magnetic wire of each of said banks for establishing magnetic domains of selected polarities in said wires, a plurality of reading means each coupled to a second end of a different magnetic wire of each of said banks for responding to the magnetic domains in said magnetic wires propagated by said polyphase driving signals, and controlled recirculation means coupled between corresponding writing means for selectively recirculating the information from the magnetic wires in a selected bank.

6. A magnetic memory system utilizing magnetic information domains which are propagated along magnetic wires comprising a plurality of propagating conductor banks each associated with a different plurality of the magnetic wires, a source of propagating signals coupled to said plurality of propagating conductor banks for applying propagating signals to a selected bank, a plurality of first and of second coils with one of each magnetically coupled to opposite ends of each of said magnetic wires, a plurality of first balanced transformer means each jointly coupled to a different first coil at corresponding magnetic wires of each of said plurality of banks, a plurality of second balanced transformer means each jointly coupled to a different second coil at corresponding magnetic wires of each of said plurality of banks, a plurality of first write means each coupled to one of said plurality of first transformer means, a plurality of second write means each coupled to one of said plurality of second transformer means, a plurality of first read means each coupled to one of said plurality of first transformer means, and a plurality of second read means each coupled to one of said plurality of second transformer means, whereby writing is performed by all of said first or said second write means to write information into the magnetic wires in only the selected bank and reading is performed by all of said first or said second read means to read information from only the selected bank.

7. A magnetic memory system for storing information in magnetic domains which are propagated along magnetic wires comprising a plurality of propagating conductor banks, a source of propagating signals, directional control means coupled between said source of propagating signals and said plurality of propagating conductor banks for applying propagating signals to selected banks for developing propagating fields to propagate the magnetic domains in a selected direction, a plurality of magnetic wires associated with each conductor bank, a plurality of first and second coils with one of each magnetically coupled to opposite ends of each of said magnetic wires, a plurality of first balanced transformer means each jointly coupled to the first coils at different magnetic wires in each of said plurality of banks, a plurality of second balanced transformer means each jointly coupled to the second coils at different magnetic wires in each of said plurality of banks, a plurality of first write means each coupled to one of said plurality of first transformer means, a plurality of second write means each coupled to one of said plurality of second transformer means, said first and second write means coupled to said directional control means, a plurality of first read means each coupled to one of said plurality of first transformer means, and a plurality of second read means each coupled to one of said second transformer means, whereby writing is performed by the first or second write means to write into the magnetic wires in only the selected bank and reading is performed by the first or second read means to read information from only the selected bank, the first or second write means being selected by the selected direction of propagation.

8. A memory system comprising a plurality of banks each including first, second, third and fourth polyphase conductors with the first and second polyphase conductors arranged to develop a first driving field and the third and fourth conductors arranged to develop a second driving field, a plurality of magnetic wires arranged in each bank to respond to said first and second driving fields, a source of first and second propagating pulses in phase quadrature with each other, selection means coupled to said first, second, third and fourth conductors, a first transformer coupled between said source of propagating pulses and said selection means for applying current pulses alternately through said first and second conductors in opposite directions in response to said first propagating pulses, a second transformer coupled between said source of propagating pulses and said selected means for applying current pulses through said third and fourth conductors in opposite directions in response to said second propagating pulses, a plurality of input coils each magnetically coupled to a first end of a different one of said magnetic wires, a plurality of output coils each magnetically coupled to a second end of a different one of said magnetic wires, a plurality of writing means each coupled to a different input coil of each of said plurality of banks for establishing magnetic informational domains in the magnetic wires of the selected bank, a plurality of reading means each coupled to a different output coil of each of said plurality of banks for responding to the magnetic informational domains in the selected bank, and timing means coupled to said source of propagating pulses and to said writing means.

9. A memory system comprising a plurality of banks each including first, second, third and fourth polyphase conductors with the first and second polyphase conductors arranged to develop a first driving field and the third and fourth conductors arranged to develop a second driving field, a plurality of magnetic wires arranged in each bank to respond to said first and second driving fields, said magnetic wires having characteristics for forming magnetic domains and for propagation of the magnetic domains along the wire in response to said first and second driving fields, a source of first and second propagating pulses in phase quadrature, selection means coupled to said first, second, third and fourth conductors, a first transformer coupled between said source of propagating pulses and said selection means for applying current pulses alternately through said first and second conductors in opposite directions in response to said first driving pulses, a second transformer coupled between said source of propagating pulses and said selection means for applying current pulses through said third and fourth conductors in opposite directions in response to said second propagating pulses, directional control means coupled to said second transformer for changing the phase of the current pulses applied through said third and fourth conductors 180 degrees so that said magnetic domains are propagated in a selected direction, a plurality of first coils each magnetically coupled to a first end of one of said magnetic wires, a plurality of second coils each magnetically coupled to a second end of one of said magnetic wires, a plurality of first writing means each coupled to a different first coil of each of said plurality of banks, a plurality of first reading means each coupled to a different second coil of each of said plurality of banks, a plurality of second writing means each coupled to a different second coil of each of said plurality of banks, a plurality of second reading means each coupled to a different first coil of each of said plurality of banks, said plurality of first and second writing means coupled to said directional control means so that writing is performed by one or the other as determined by the direction of propagation, and timing means coupled to said source of propagating pulses and to said plurality of first and second writing means.

10. A system utilizing magnetic wires having characteristics for forming and maintaining magnetic informational domains propagated therethrough comprising a plurality of banks of magnetic wires with a selected number of said banks arranged in groups, a plurality of first and second polyphase conductor means with a different first and second polyphase conductor means in each bank adjacent to the magnetic wires thereof, each of said first and second conductor means including a first and second conductor, a plurality of groups of first transistors each having a base and first and second load terminals with the first terminals of the transistors of each group coupled to the first end of a conductor of said polyphase conductor means of a different group, a plurality of second transistors each having a base and first and second load terminals with the first load terminal of each of said second transistors coupled to the conductors of said polyphase conductors means of a bank in each of said groups, a source of potential coupled to the second load terminals of said second transistors, first selection means coupled to the bases of said first transistors for applying an energizing potential to the bases of the first transistors coupled to the polyphase conductor means of a selected group, second selection means coupled to the bases of said second transistors for selecting a bank of first and second polyphase conductors in each of said groups, a source of alternating first and second driving pulses having a first and second phase relation in quadrature with each other, directional means coupled between said source of first and second pulses and the second load terminals of said first transistors for applying said first driving pulses to said first polyphase conductor means and for selectively applying said second driving pulses or said second driving pulses after inversion to said second polyphase conductor means, recording means coupled to first end of said plurality of magnetic wires and to said source of driving pulses for establishing magnetic domains having selected polarity relations in said magnetic wires as said first and second driving pulses or inverted second driving pulses are applied to the first and second polyphase conductors of the selected bank, and reading means coupled to the second ends of said magnetic wires to respond to the magnetic domains propagated thereby.

11. A shift register system comprising a plurality of shift register banks each including a plurality of magnetic wires having characteristics for propagating magnetic domains therealong in response to a driving field and including polyphase conductor means adjacent to said plurality of magnetic wires, a plurality of groups of first switching means having first and second terminals and a control terminal with the switching means of each group having a first terminal coupled to the polyphase conductor means in a different bank, a plurality of second switching means each having first and second terminals and a control terminal with the first terminal of each coupled to a polyphase conductor means of a different bank, first selection means coupled to the control terminals of said first switching means for selecting the first switching means coupled to a selected bank, second selection means coupled to the control terminals of said second switching means for selecting a bank in each one of said plurality of groups, a source of reference potential coupled to the second terminals of second switching means, a source of polyphase driving signals coupled to the second terminals of said first plurality of switching means for applying said driving signals to the conductor means of the selected bank, a plurality of first and second coils respectively mounted adjacent to first and second end of each of said magnetic wires, a plurality of recording means each coupled to a different first coil of each of said plurality of banks and to said source of driving signals for establishing magnetic domains in said magnetic wires having selected polarities, a plurality of reading means each coupled to the second coils of the corresponding wires to which said recording means are associated for responding to the magnetic domains propagated thereby, and a plurality of recirculation control means coupled between corresponding recording and reading means for selectively recirculating the information from the second coils to the first coils.

12. A shift register memory system comprising a plurality of banks of propagating conductors each including first and second conductors positioned to develop first driving fields and third and fourth conductors positioned to develop second driving fields, a plurality of magnetic wires associated with each of said banks for responding to said first and second driving fields, a source of first and second driving pulses in phase quadrature with each other, a plurality of groups of first, second, third and fourth transistors each having a base and first and second load terminals, the first load terminal of each group of said first, second, third and fourth transistors respectively coupled to a first end of said first, second, third and fourth conductors of a different bank, first selection means coupled to the bases of said plurality of first, second, third and fourth transistors, second selection means coupled to the second ends of said plurality of conductors, a first transformer having a first winding coupled to said source of driving pulses for responding to said first driving pulses and having a second winding with opposite ends coupled to the second load terminals of each of said first and second transistors, a second transformer having a first input winding and first and second output windings, said first input winding coupled to said source of driving pulses for responding to said second driving pulses, said first output winding having first and second ends respectively coupled to the second load terminals of each of said third and fourth transistors and said second output winding having a first end respectively coupled to the second load terminals of each of said fourth and third transistors, directional control flip flop means, said first and second output windings of said second transformer having center taps coupled to said directional flip flop means for energizing one winding to select the direction of propagation of said first and second driving fields, a plurality of first read-write coils each magnetically coupled to a first end of a different magnetic wire, a plurality of second read-write coils each magnetically coupled to the second end of a different magnetic wire, a plurality of first balanced transformers each having a first winding with a center tap and a second winding, each of said first windings of said first balanced transformers having a first end coupled to a different first read-write coil in each bank of a selected half of said banks and a second end coupled to a different first read-write coil in each bank of the other half of said banks, a plurality of second balanced transformers each having a first winding with a center tap and a second winding, each of said first windings of each second balanced transformer having a first end coupled to a different second read-write coil in each bank of said selected half of said banks and a second end coupled to a different second read-write coil in each bank of the other half of said banks, a plurality of first writing means each coupled to the center tap of said first windings of a different one of said first balanced transfromers, a plurality of second writing means each coupled to the center tap of a different one of said first windings of said second balanced transformers, said plurality of first and second writing means coupled to said directional flip flop means for energizing one or the other as determined by the direction of propagation, a plurality of first read means each coupled to the second winding of a different one of said first balanced transformers, a plurality of second read means each coupled to the second winding of a different one of said second balanced transformers, and control means coupled to said source of first and second driving pulses and to said plurality of first and second writing means for establishing magnetic domains in the magnetic wires in a selected bank in time sequence with the driving pulses, said selected plurality of writing means alternately establishing a reference domain and a digit domain as the domains are propagated in the selected direction.

References Cited by the Examiner
UNITED STATES PATENTS

| | | | |
|---|---|---|---|
| 3,069,665 | 12/1962 | Bobeck | 340—174 |
| 3,093,818 | 6/1963 | Hunter | 340—174 |
| 3,114,898 | 12/1963 | Fuller | 340—174 |
| 3,139,531 | 6/1964 | Franck et al. | 340—174 |
| 3,157,865 | 11/1964 | Bradley | 340—174 |

IRVING L. SRAGOW, *Primary Examiner.*

WALTER W. BURNS, JR., *Examiner.*

S. URYNOWICZ, *Assistant Examiner.*

UNITED STATES PATENT OFFICE
CERTIFICATE OF CORRECTION

Patent No. 3,248,716                                        April 26, 1966

Richard L. Snyder

It is hereby certified that error appears in the above numbered patent requiring correction and that the said Letters Patent should read as corrected below.

Column 6, line 18, for "552", second occurrence, read -- 522 --; column 7, line 6, for "68" read -- 648 --; line 72, for "logical" read -- logic --; column 8, line 1, for "one-short" read -- one-shot --; line 59, for "wire" read -- write --; column 9, line 75, for "circuit" read -- circuits --; column 14, line 10, for "to" read -- the --; line 15, for "flops" read -- flop --; column 18, line 46, for "from" read -- form --; column 21, line 1, after "coupled" insert -- to opposite --; line 46, for "similar" read -- simpler --; column 23, line 28, after "means" insert -- and said reading means --; column 24, line 29, for "selected" read -- selection --.

Signed and sealed this 1st day of August 1967.

(SEAL)
Attest:

EDWARD M. FLETCHER, JR.                          EDWARD J. BRENNER
Attesting Officer                                      Commissioner of Patents